(12) United States Patent
Krumm et al.

(10) Patent No.: US 9,904,709 B2
(45) Date of Patent: Feb. 27, 2018

(54) INTEGRATION OF LOCATION LOGS, GPS SIGNALS, AND SPATIAL RESOURCES FOR IDENTIFYING USER ACTIVITIES, GOALS, AND CONTEXT

(71) Applicant: Microsoft Corporation, Redmond, WA (US)

(72) Inventors: John C. Krumm, Redmond, WA (US); Eric J. Horvitz, Kirkland, WA (US); Ramaswamy Hariharan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 303 days.

(21) Appl. No.: 14/024,511

(22) Filed: Sep. 11, 2013

(65) Prior Publication Data

US 2014/0012874 A1 Jan. 9, 2014

Related U.S. Application Data

(63) Continuation of application No. 13/040,067, filed on Mar. 3, 2011, now Pat. No. 8,539,380, which is a
(Continued)

(51) Int. Cl.
*G06F 17/30* (2006.01)
*H04W 4/02* (2018.01)
(Continued)

(52) U.S. Cl.
CPC .... *G06F 17/30522* (2013.01); *G06F 17/3087* (2013.01); *H04L 67/18* (2013.01);
(Continued)

(58) Field of Classification Search
CPC ................................... G06F 3/048; G06F 3/14
(Continued)

(56) References Cited

U.S. PATENT DOCUMENTS

| 5,212,430 A | 5/1993 | Jartyn |
| 5,395,042 A | 3/1995 | Riley et al. |

(Continued)

FOREIGN PATENT DOCUMENTS

WO   1998000787 A1   1/1998

OTHER PUBLICATIONS

Leigh McAlister; A Dynamic Attribute Satiation Model of Variety-Seeking Behavior; Sep. 1982; Journal of Consumer Research; vol. 9; pp. 141-150.*

(Continued)

*Primary Examiner* — Andrew Dyer
(74) *Attorney, Agent, or Firm* — Davin Chin; Chin IP, PLLC

(57) ABSTRACT

Described are methods that utilize a geographic location technology (e.g., GPS) to determine user location data, and existing network-based websites (e.g., Internet websites) for searching and accessing data related to the location data such that the user context can be developed and stored. A location component is provided that determines location data of a wireless communications device of a user. A context component is provided that accesses context data based on the location data to define a context in which the device is located. Activities, goals, and overall context of a user can be inferred through statistical fusion of multiple sources of evidence. The context data is presented to the user via the wireless device such that the user can make decisions as to where to go, for example. User preferences can be accessed and applied to filter context data according to what the user desires to see and access.

20 Claims, 19 Drawing Sheets

Related U.S. Application Data continuation of application No. 11/172,474, filed on Jun. 30, 2005, now Pat. No. 7,925,995.

(51) Int. Cl.
   *H04W 4/18* (2009.01)
   *H04L 29/08* (2006.01)

(52) U.S. Cl.
   CPC ............ *H04W 4/02* (2013.01); *H04W 4/028* (2013.01); *H04W 4/18* (2013.01)

(58) Field of Classification Search
   USPC .................. 715/851, 855, 857, 862, 864
   See application file for complete search history.

(56) References Cited

U.S. PATENT DOCUMENTS

| | | | |
|---|---|---|---|
| 5,493,692 A | 2/1996 | Theimer et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,812,865 A | 9/1998 | Theimer et al. | |
| 5,903,235 A | 5/1999 | Nichols | |
| 6,321,158 B1 | 11/2001 | DeLorme et al. | |
| 6,353,398 B1 | 3/2002 | Amin et al. | |
| 6,400,996 B1 | 6/2002 | Hoffberg et al. | |
| 6,401,085 B1 | 6/2002 | Gershman et al. | |
| 6,453,237 B1 | 9/2002 | Fuchs et al. | |
| 6,466,232 B1 | 10/2002 | Newell et al. | |
| 6,496,842 B1 | 12/2002 | Lyness | |
| 6,513,046 B1 | 1/2003 | Abbott et al. | |
| 6,515,620 B1 | 2/2003 | Jandrell | |
| 6,549,915 B2 | 4/2003 | Abbott et al. | |
| 6,615,186 B1 | 9/2003 | Kolls | |
| 6,672,506 B2 | 1/2004 | Swartz et al. | |
| 6,675,081 B2 | 1/2004 | Shuman et al. | |
| 6,735,557 B1 | 5/2004 | Castellar et al. | |
| 6,741,188 B1 | 5/2004 | Miller et al. | |
| 6,747,675 B1 | 6/2004 | Abbott et al. | |
| D494,584 S | 8/2004 | Schlieffers et al. | |
| 6,791,580 B1 | 9/2004 | Abbott et al. | |
| 6,795,768 B2 | 9/2004 | Bragansa et al. | |
| 6,796,505 B2 | 9/2004 | Pellaumail et al. | |
| 6,801,223 B1 | 10/2004 | Abbott et al. | |
| 6,801,836 B2 | 10/2004 | Schanin | |
| 6,812,937 B1 | 11/2004 | Abbott et al. | |
| 6,813,501 B2 * | 11/2004 | Kinnunen et al. | 455/456.2 |
| 6,816,686 B2 | 11/2004 | Hooper et al. | |
| 6,837,436 B2 | 1/2005 | Swartz et al. | |
| 6,842,877 B2 | 1/2005 | Robarts et al. | |
| 6,850,252 B1 | 2/2005 | Hoffberg | |
| 6,868,325 B2 | 3/2005 | Menon et al. | |
| 6,937,135 B2 | 8/2005 | Kitson et al. | |
| 6,954,657 B2 | 10/2005 | Bork et al. | |
| 7,010,501 B1 | 3/2006 | Roslak et al. | |
| 7,027,773 B1 | 4/2006 | McMillin | |
| 7,040,541 B2 | 5/2006 | Swartz et al. | |
| 7,053,826 B1 | 5/2006 | McBurney et al. | |
| 7,063,263 B2 | 6/2006 | Swartz et al. | |
| 7,068,444 B2 | 6/2006 | Nishi | |
| 7,117,087 B2 | 10/2006 | Jung et al. | |
| 7,171,378 B2 | 1/2007 | Petrovich et al. | |
| 7,195,157 B2 | 3/2007 | Swartz et al. | |
| 7,327,245 B2 | 2/2008 | Krumm et al. | |
| 7,385,501 B2 | 6/2008 | Miller et al. | |
| 7,570,943 B2 | 8/2009 | Sorvari et al. | |
| 7,630,986 B1 * | 12/2009 | Herz et al. | |
| 7,693,817 B2 | 4/2010 | Dumais et al. | |
| 7,739,210 B2 | 6/2010 | Horvitz et al. | |
| 7,779,015 B2 | 8/2010 | Abbott et al. | |
| 7,813,822 B1 | 10/2010 | Hoffberg | |
| 7,831,679 B2 | 11/2010 | Apacible et al. | |
| 7,886,005 B1 | 2/2011 | Zahariev | |
| 7,925,995 B2 | 4/2011 | Krumm et al. | |
| 7,979,252 B2 | 7/2011 | Horvitz et al. | |
| 7,991,718 B2 | 8/2011 | Horvitz et al. | |
| 8,225,214 B2 | 7/2012 | Abbott et al. | |
| 8,364,397 B2 | 1/2013 | Rick et al. | |
| 2001/0018349 A1 * | 8/2001 | Kinnunen et al. | 455/456 |
| 2001/0030664 A1 | 10/2001 | Shulman et al. | |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0032689 A1 | 3/2002 | Abbott et al. | |
| 2002/0044152 A1 | 4/2002 | Abbott et al. | |
| 2002/0052930 A1 | 5/2002 | Abbott et al. | |
| 2002/0052963 A1 | 5/2002 | Abbott et al. | |
| 2002/0054130 A1 | 5/2002 | Abbott et al. | |
| 2002/0054174 A1 | 5/2002 | Abbott et al. | |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0099817 A1 | 7/2002 | Abbott et al. | |
| 2002/0122055 A1 | 9/2002 | Parupudi et al. | |
| 2002/0191034 A1 | 12/2002 | Sowizral et al. | |
| 2003/0046401 A1 | 3/2003 | Abbott et al. | |
| 2003/0154476 A1 | 8/2003 | Abbott et al. | |
| 2004/0070602 A1 | 4/2004 | Kobuya et al. | |
| 2004/0201500 A1 | 10/2004 | Miller et al. | |
| 2005/0027590 A9 | 2/2005 | Gailey et al. | |
| 2005/0034078 A1 | 2/2005 | Abbott et al. | |
| 2005/0050027 A1 * | 3/2005 | Yeh et al. | 707/3 |
| 2005/0125295 A1 | 6/2005 | Tidwell et al. | |
| 2005/0266858 A1 | 12/2005 | Miller et al. | |
| 2005/0272442 A1 | 12/2005 | Miller et al. | |
| 2006/0004680 A1 | 1/2006 | Robarts et al. | |
| 2006/0010206 A1 | 1/2006 | Apacible et al. | |
| 2006/0019676 A1 | 1/2006 | Miller et al. | |
| 2006/0156209 A1 | 7/2006 | Matsuura et al. | |
| 2007/0005571 A1 | 1/2007 | Brewer et al. | |
| 2007/0006098 A1 | 1/2007 | Krumm et al. | |
| 2007/0288196 A1 | 12/2007 | Frank et al. | |
| 2007/0299605 A1 | 12/2007 | Onishi et al. | |
| 2008/0090591 A1 | 4/2008 | Miller et al. | |
| 2008/0091537 A1 | 4/2008 | Miller et al. | |
| 2008/0161018 A1 | 7/2008 | Miller et al. | |
| 2008/0319727 A1 | 12/2008 | Horvitz et al. | |
| 2009/0006297 A1 | 1/2009 | Horvitz et al. | |
| 2009/0055752 A1 | 2/2009 | Abbott et al. | |
| 2010/0262573 A1 | 10/2010 | Abbott et al. | |
| 2011/0093787 A1 | 4/2011 | Abbott et al. | |
| 2011/0288839 A1 | 11/2011 | Horvitz et al. | |

OTHER PUBLICATIONS

Emine Sarigöllü; Assessing the Predictive Effectiveness of the Variety Seeking and Reinforcement Models; 1994; Applied Stochastic Models and Data Analysis; vol. 10; pp. 27-46.*

Billinghurst, et al., An Evaluation of Wearable Information Spaces, Proceedings of the Virtual Reality Annual International Symposium, 1998, 8 pages.

Billinghurst, et al., Wearable Devices: New Ways to Manage Information, IEEE Computer Society, Jan. 1999, pp. 57-64.

Chen, et al., A Survey of Context-Aware Mobile Computing Research, Dartmouth Computer Science Technical Report, 2000, 16 pages.

Harter, et al. "A Distributed Location System for the Active Office", IEEE Network, 1994 pp. 62-70.

Horvitz et al., In Pursuit of Effective Handsfree Decision Support: Coupling Bayesian Interference, Speech Understanding, and Understanding, and User Models, 1995, 8 pages.

International Search Report dated Sep. 29, 2003 for PCT U.S. Appl. No. 00/020,685, 3 pages.

Losee, Jr., Minimizing Information Overload: the ranking of electronic messages, Journal of Information Science 15, Elsevier Science Publishers B.V. 1989, pp. 179-189.

(56) References Cited

OTHER PUBLICATIONS

Rhodes, Remembrance Agent: A continuously running automated information retrieval system, The Proceedings of the First International Conference on the Practical Application of Intelligent Agents and Multi Agent Technolog, 1996, pp. 487-495.

Rhodes, The Wearable Remembrance Agent: A System for Augmented Memory. Personal Technologies Journal Special Issue on Wearable Computing, 1997, 12 pages.

Schilit et al., Context-Aware Computing Applications, In Proceedings of the Workshop on Mobile Computing Systems and Applications, Dec. 1994, pp. 85-90.

Schilit et al., Customizing Mobile Applications, Proceedings USENIX Symposiumon Mobile and Location Independent Computing, Aug. 1993, 9 pages.

Schilit, et al. The ParcTab Mobile Computer System, IEEE WWOS-IV, 1993, 4 pages.

Spreitzer et al., "Providing Location Information in a Ubiquitous Computing Environment," Xeriox Palo Alto Research Center, ACM, 1993, pp. 270-283. http://www.computing/staff/kc/Lecturing/MSc/wk10/p270-spreitzer.- pdf. Last access Dec. 9, 2008, 14 pages.

Spreitzer et al., Architectural Considerations for Scalable, Secure, Mobile Computing with Location Information, In The 14th International Conference on Distributed Computing Systems, Jun. 1994, pp. 29-38.

Spreitzer et al., Scalable, Secure, Mobile Computingh with Location Information Communications of the ACM, Jul. 1993, 1 page, vol. 36—No. 7.

Theimer et al., Operating System Issue for PDAs, In Fourt Workshop on Workstation Operating Systems, 1993, 7 pages.

Want, Active Badges and Personal Interactive Computing Objects, IEEE Transactions on Consumer Electronics, 1992, 11 pages, vol. 38—No. 1.

Want, et al., The Active Badge Location System, ACM Transactions on Information Systems, Jan. 1992, pp. 91-102, vol. 10—No. 1.

Weiser, Some Computer Science Issues in Ubiquitous Computing, Communications of the ACM, Jul. 1993, pp. 75-84, vol. 36—No. 7.

Weiser, The Computer for the 21st Century, Scientific American, Sep. 1991, 8 pages.

[No. Author Listed] METAR Data Access. NOAA. Available at http://weather.noaa.gov/weather/metar.shtml. Accessed on Jul. 19, 2005. 3 pages.

Krumm, TempIO: Inside/Outside Classification with Temperature. The Second International Workshop on Man-Machine Symbiotic Systems. Kyoto, Japan. Nov. 23-24, 2004, pp. 241-250.

Schilit et al, Disseminating Active Map Information to Mbile Hosts, IEEE Network, 1994, pp. 22-32, vol. 8—No. 5.

Collins, A Comparison of Spatial Interpolation Techniques in Temperature Estimation. Third International Conference/Workshop on Integrating GIS and Environmental Modeling. Santa Fe. 1996. pp. 1-7.

Rhodes, B., "The Wearable Remembrance Agent: A System for Augmented Memory," Proceedings of the First International Symposium on Wearable Computers (ISW '97), Cambridge, MA, Oct. 13-14, 1997. pp. 1-7.

* cited by examiner

INTEGRATION OF LOCATION LOGS, GPS SIGNALS, AND SPATIAL RESOURCES FOR IDENTIFYING USER ACTIVITIES, GOALS, AND CONTEXT

CROSS-REFERENCE TO RELATED APPLICATIONS

This application is a continuation of U.S. patent application Ser. No. 13/040,067, filed Mar. 3, 2011, entitled "INTEGRATION OF LOCATION LOGS, GPS SIGNALS, AND SPATIAL RESOURCES FOR IDENTIFYING USER ACTIVITIES, GOALS, AND CONTEXT", which is a continuation of U.S. patent application Ser. No. 11/172,474, entitled "INTEGRATION OF LOCATION LOGS, GPS SIGNALS, AND SPATIAL RESOURCES FOR IDENTIFYING USER ACTIVITIES, GOALS AND CONTEXT," filed on Jun. 30, 2005, now U.S. Pat. No. 7,925,995, issued Apr. 12, 2011. The entireties of the above-noted applications/patents are incorporated by reference herein.

This application is also related to U.S. Pat. No. 7,647,171, issued Jan. 12, 2010, entitled "LEARNING, STORING, ANALYZING, AND REASONING ABOUT THE LOSS OF LOCATION-IDENTIFYING SIGNALS," filed on Jun. 29, 2005, and U.S. Pat. No. 7,327,245, issued Feb. 5, 2008, entitled "SENSING AND ANALYSIS OF AMBIENT CONTEXTUAL SIGNALS FOR DISCRIMINATING BETWEEN INDOOR AND OUTDOOR LOCATIONS," filed on Nov. 22, 2004. The entireties of the above-noted applications are incorporated by reference herein.

BACKGROUND

As computing moves off the desktop into the hands of mobile users, it is becoming more important for mobile devices to be aware of the user's context. Important pieces of context include the user's location, activities, nearby people and devices, and mode of transportation, if any. This knowledge can in turn be used by mobile devices to display reminders, to configure themselves for use with other devices, and to behave in a way that is appropriate for the surrounding environment (e.g., turn off cell phone ringer) or subcontexts of the surrounding environment such as whether particular states or transitions among states are occurring within the environment.

One aspect of context concerns whether or not the user (and the device) is inside or outside of a building or structure. For example, knowledge of such information can be used to facilitate determining the user's location (e.g., in a building or structure, in a particular building or structure, or in one of a set of known buildings or structures) and the user's mode of transportation (e.g., in a bus, car or airplane). Such knowledge can also be used to conserve power on systems that do not provide useful services inside buildings or outside. For example, because GPS technology typically fails to operate inside a structure because GPS satellite signals cannot penetrate the structure, determination of the likelihood that a user is inside can be used to turn off a handheld GPS subsystem or put the handheld system into a reduced-power mode whereby it probes for the absence of satellite signals periodically so as to conserve the batteries of the GPS system. When sufficient GPS signal strength is again detected, the handheld system resumes full power to the GPS subsystem.

Another aspect of context is related to a larger scale, that is, urban canyons. Knowledge of where the user has traveled, currently is, and is heading in an urban canyon, which includes structures such as multi-story buildings (principally, and whether the user is inside or outside of the building), but also include trees, hills, and tunnels (generally), can be of value to the user and to companies that seek to benefit economically by knowledge of the user location by providing location-based services to the user.

Conventional location-based services use knowledge of a user location to index into services and data that are likely to be useful at that location. For instance, a conventional reminder application like may give the user relevant information at a given location, such as "You're near a grocery store, and you need milk at home." Another conventional application, known as an "electronic graffiti" system supports a user who chooses to leave electronic notes (for him/her or others) that are associated with a particular location, such as "There is a better Thai restaurant one block north of here." Additionally, location-based tour guide applications offer relevant information about an exhibit or site at which the user is standing. These and most other location-based services share a need for a custom database dedicated to storing and serving data for specified locations.

In other words, reminder systems must have reminders, electronic graffiti systems need digital tags, and tour guide systems need site information, each of which require a custom, location-sensitive database that must be built especially for the application. Thus, deployment costs reduce the initial appeal of such services. While a custom data store of location-indexed data can lead to interesting applications, there is already a wealth of location-tagged data already available on the Internet that can be easily exploited to create compelling location-aware applications without the data deployment costs of traditional applications of this type.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

Disclosed and claimed herein, in one aspect thereof, is architecture that utilizes a geographic location technology (e.g., GPS) to determine user location data, and existing network-based websites (e.g., Internet websites) for searching and accessing data related to the location data such that the user context can be developed and stored. In furtherance thereof, the architecture includes a location component that determines location data of a wireless communications device of a user and a context component that accesses context data based on the location data to define a context in which the device is located. The context data is presented to the user via the wireless device such that the user can make decisions as to where to go, for example. User preferences can be accessed and applied to filter context data according to what the user desires to see and access. It is to be appreciated that the geographic location technology can also include, for example, WiFi triangulation, cellular telephone triangulation, radio frequency signal strengths, and digital television signals.

In another aspect of the subject invention there is provided a Bayesian network employed for determining user context. The Bayesian network processes data such as latitude/longitude location data, barometric data (for altitude determination), temperature, motion, device health data, velocity (and mean velocity) data, GPS shadow information, and location resources data, for example. Reliability analysis is performed to determine the reliability of particular data.

In yet another aspect thereof, a machine learning and reasoning component is provided that employs a probabilistic and/or statistical-based analysis to prognose or infer an action that a user desires to be automatically performed.

In still another aspect of the invention, power management is employed to manage device power according to the user context, location data (e.g., in communications shadow or not), and other measured and inferred parameters.

In other aspects of the subject invention, three applications are described that benefit from the location and context awareness architecture. A first application, a "context resolver", infers a user context based on his or her GPS coordinates, queries from an Internet mapping service, and general Internet searches. It is assumed the user is equipped with a GPS receiver and Internet-connected computer such that using the lat/long data, software can be employed to compute the nearest street address. This first application is designed to give information about a mobile user's immediate surroundings.

A second application includes pointing a pose-sensitive query device at a scene of interest and obtaining a list of businesses that are situated along that direction. The second application is based on a device (or a combination of intercommunicating devices) containing a GPS receiver, electronic compass, and network connection. The user physically points the device at something and issues a query. The second application uses a network-based mapping service to find businesses in the direction of pointing, using the GPS coordinates and the electronic compass. It also allows a mobile user to point toward an outside object and discover what is inside or behind it.

A third application builds a map and clickable links to help automatically annotate a trip based on GPS coordinates. A computing device is employed to access a network of existing websites (e.g., the Internet), using location data in the form latitude/longitude coordinates as search terms to find websites that process the coordinates. User preferences, as accessed, can also be used to filter and further define the user context at this location. In other words, for each set of coordinates, the user context can be defined in terms of nearby streets, nearby businesses, environment, and so on. The context information is used to generate a map of where the user has been, and in more robust implementations, predictions on where the user is likely to head. The map can be annotated according to user preferences, and stored.

In other aspects of the disclosed innovation, there are provided methods for inferring a user context from location and other sensor data, and then using this information in a useful way. Additionally, Web pages are found that are relevant to the user's current location or direction of travel. As well, a trip can be automatically annotated based on geographic location information of the traveler, Web services, and Web searches.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
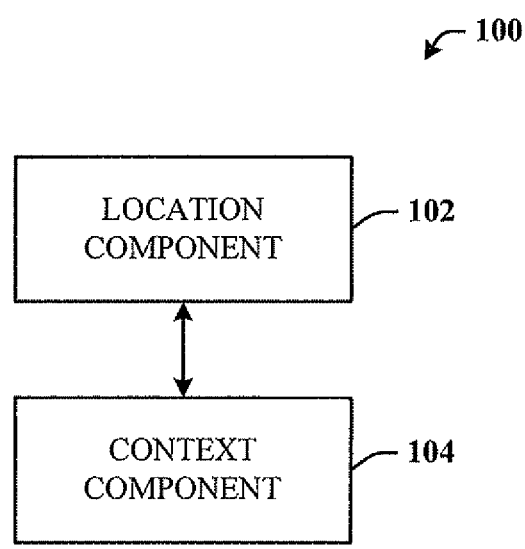
FIG. 1 illustrates a system that facilitates location-based services and user context awareness.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

While certain ways of displaying information to users are shown and described with respect to certain figures as screenshots, those skilled in the relevant art will recognize that various other alternatives can be employed. The terms "screen," "web page," and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

Referring initially to the drawings, FIG. 1 illustrates a system 100 that facilitates location-based services and user context awareness. The system 100 includes a location component 102 that facilitates the determination of a geographic location data of a wireless communications device of the user (and hence, the associated user). In communication with the location component 102 is a context component 104 that in cooperation therewith, determines and/or infers the current context of the user. In operation, the location component 102 is employed to determine the location coordinates of the user, which coordinates can then be used by the context component 104 to search for nearby streets, addresses, structures (e.g., buildings, tunnels, bridges, . . . ) and businesses, for example. Once the user location is determined, advertising and user preferences can be applied based on the user location and the nearby businesses. These and other related benefits are described in greater detail infra.

In one implementation, the geographic location data is determined by receiving geographic location signals of a GPS (global positioning system) technology. Currently, GPS consists of a constellation of twenty-four satellites each in its own orbit approximately 11,000 miles above the earth. Each of the satellites orbits the earth in about twelve hours, and the positions of which are monitored by ground stations. The satellites each include atomic clocks for extremely accurate timing (e.g., within three nanoseconds of each other) that provides the capability to locate the location component 102 (e.g., a handheld terrestrial receiver) on the earth within, in some applications, one meter resolution.

The GPS location data can be received from the location component 102 which is, for example, a wireless assisted GPS (WAGPS) device such as a GPS-enabled cellular telephone, GPS-enabled PDA, etc. WAGPS facilitates the transmission of the GPS location data from the location component 102 to a remote location. Generally, this can occur through a cellular network (not shown) where the location component 102 is a cellular telephone, to an IP network (not shown) (e.g., the Internet), and terminating at the remote location, node or device on the Internet or on a subnet thereof.

When receiving geographic location signals from several of the GPS satellites, the location component 102 can calculate the distance to each satellite of the communicating satellites and then calculate its own position, on or above the surface of the earth. However, when the signals are interrupted or degraded due to terrestrial structures, such interrupt time and position information can be useful in determining GPS shadow. A shadow is an area of communications interruption or total signal blockage. In the context of GPS, shadows are areas where a terrestrial receiver cannot receive adequate GPS signals due to signal blockage or degradation by any of many types of structures that include buildings, bridges, trees, hills, water (when submerged) and tunnels, for example. Such shadow information can be utilized in accordance with the subject invention, and is described infra.

It is to be appreciated, however, that the geographic location technology can also include, for example, WiFi triangulation, cellular telephone triangulation, radio frequency signal strengths, and digital television signals.

Figure 2:
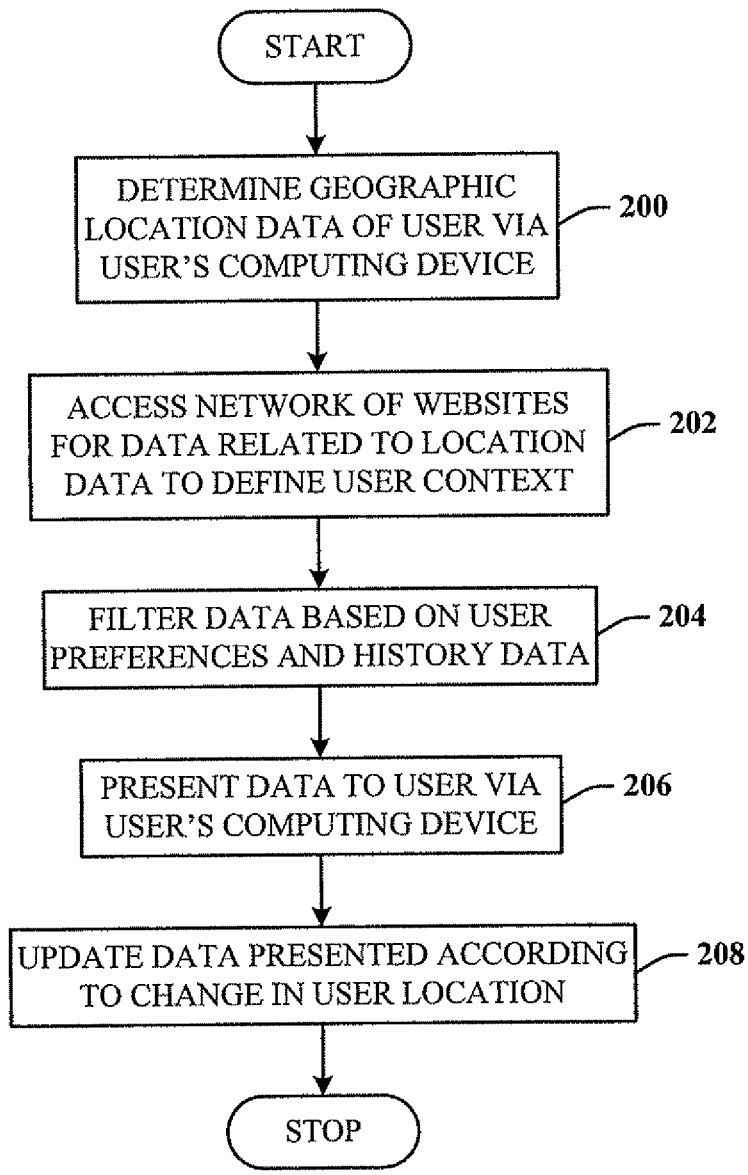
FIG. 2 illustrates a methodology of providing location-based services and user context awareness.

FIG. 2 illustrates a methodology of providing location-based services and user context awareness. While, for purposes of simplicity of explanation, the one or more methodologies shown herein, e.g., in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, geographic location data (e.g., latitude/longitude or "lat/long" data) of the user (e.g., via a GPS-enabled device) is determined. At 202, using the location data, a search is performed on websites disposed on a network (e.g., the Internet) for an address (or addresses) that corresponds to the lat/long data. It is to be appreciated that the GPS-enable device can communicate the location data to a computing device which can access one or more websites of information that currently exist, on the Internet, for example. Thus, no special databases need to be created for operation of the subject invention, since the information desired already exists. Additionally, given the current state of the technology, a single computing device such as a portable computer can be GPS-enabled such that the lat/long data can be used to search the Internet directly via the portable computer. There can exist a website, referenced by a hyperlink as returned by the web search, that converts the lat/long data to streets and addresses. Another website can then be accessed using the streets and/or addresses to search for businesses associated therewith or nearby businesses. As will be described hereinbelow, an inference component can be employed to make inferences as to which of the streets (and/or addresses) can apply to a given set of location data, and optionally, further in view of processed user profile (or preferences) data.

At 204, in that network access is provided, user preferences can also be accessed and processed against the returned search data. Additionally, history data of past user actions can be tracked and processed for anticipating (or inferring) future actions, and thus, what types of data that will be presented to the user. At 206, the filtered data is presented to the user via the user device. At 208, the data presented can be continually updated based on changes in user location, or lack of being capable of detecting a change in the user location, for example.

Figure 3:
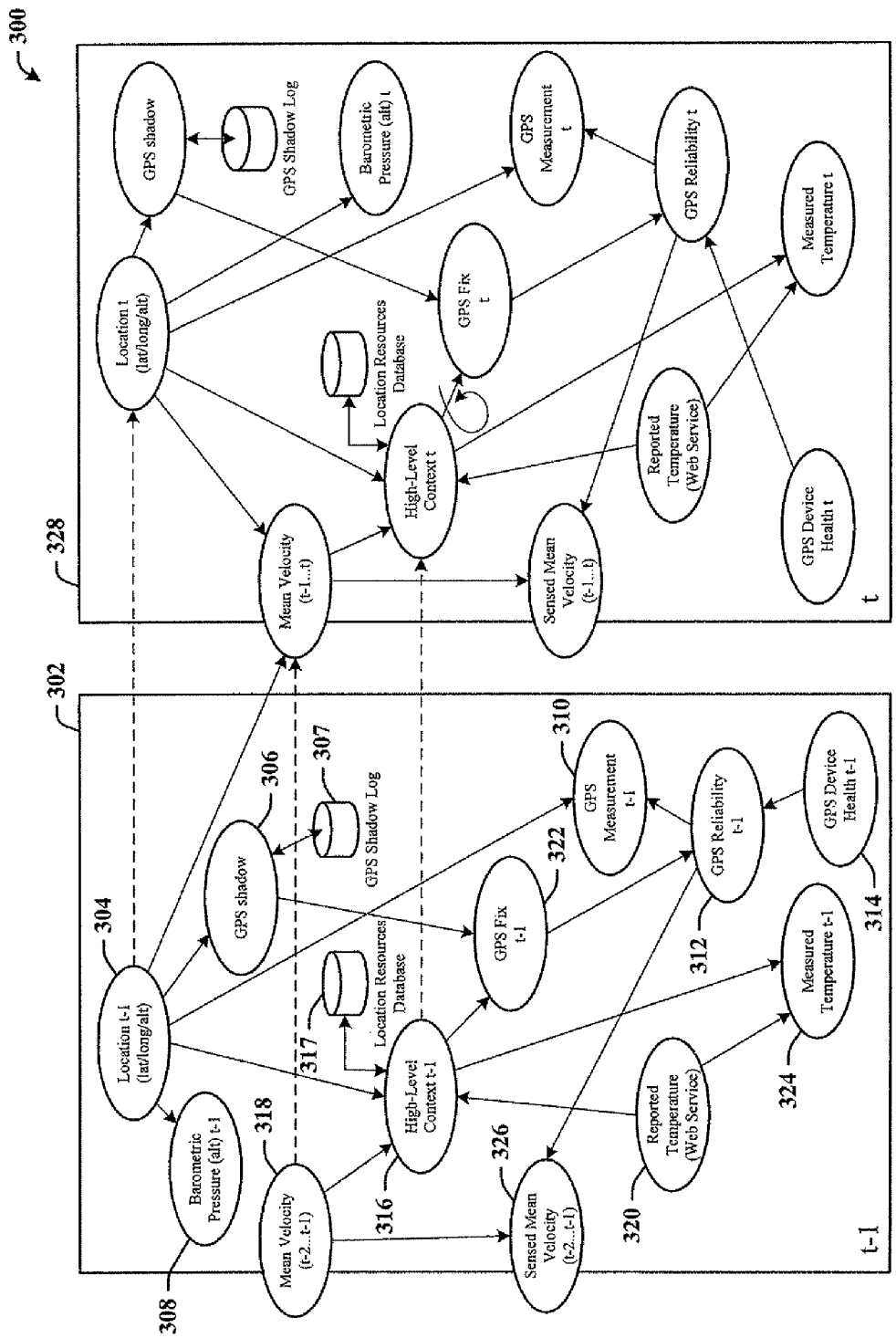
FIG. 3 illustrates a dynamic Bayesian network for location and context processing.

Referring now to FIG. 3, there is illustrated implementation of a dynamic Bayesian network 300 for location and context processing. As illustrated, the network 300 explores multiple observations (called nodes) from a time t-1 to a time t. The following nodes are depicted in a network block 302 at time t-1. A location node 304 provides data (denoted lat/long/alt) to other network nodes related to latitude, longitude, and in this implementation, altitude above the surface of the earth.

The location node 304 connects to provide lat/long/alt data to a GPS shadow node 306, which data can be used to access GPS shadow data (or maps) for associated lat/long locations, and structures at those locations. The GPS shadow mapping data is stored in a GPS shadow log store 307. The location node 304 also connects to pass data to a barometric pressure node 308 utilized for determining and providing altitude data of the user (via the user device). It is to be appreciated that depth (below the surface of the earth) can also be a parameter. For example, it is possible that a hole or depression puts the user location below the earth's surface. Barometric pressure data can be employed to determine the location of the user relative to the vertical axis.

The location node 304 provides lat/long/alt data to a GPS measurement node 310 that processes the GPS measurement data in combination with GPS reliability data received from a GPS reliability node 312. Thus, a level of confidence value of the GPS measurement data can be computed from the reliability data. The GPS reliability node 312 can process additional data about the health and status of the device by further receiving device health data from a device health node 314.

The location node 304 passes lat/long/alt data to a high-level context node 316 that processes all received information to compute a high-level context at time t-1. The context node 316 has an associated location resources database 317 that receives and stores data related to where the user has been (e.g., streets, addresses, and businesses), currently is (e.g., streets, addresses, and businesses), user activities performed along the way, and so on. The context data accumulates over time and is continually processed to generate mappings, historical data, update user preferences, and is used to infer future events and/or activities related to the user and the user's device, for example. Received information further includes mean velocity data from a mean velocity node 318, the mean velocity data computed from a time t-2 (not shown) to a time t-1, and reported temperature data from a reported temperature node 320. The reported temperature data can be accessed from existing websites. The high-level context node 316 passes data to a GPS fix node 322, which GPS fix node 322 also receives data from the GPS shadow node 306. Processing this received information, the GPS fix node 322 can compute the user location also considering the GPS shadow information. The GPS fix node 322 also passes data to the GPS reliability node 312.

The high-level context node 316 passes data to a measured temperature node 324 that also received data from the reported temperature node 320. Thus, the temperature node 324 provides a final computed temperature for the network 300 at time t-1. The network 300 also includes a sensed mean velocity node 326 that receives mean velocity data from time t-2 to time t-1 to create sensed mean velocity data computed when also considering GPS reliability data received from the GPS reliability node 312.

The location node 304, mean velocity node and high-level context nodes pass data and/or maintain data forward in time to the next time period t, as denoted in a block 328, when data updates are made for all nodes.

Figure 4:
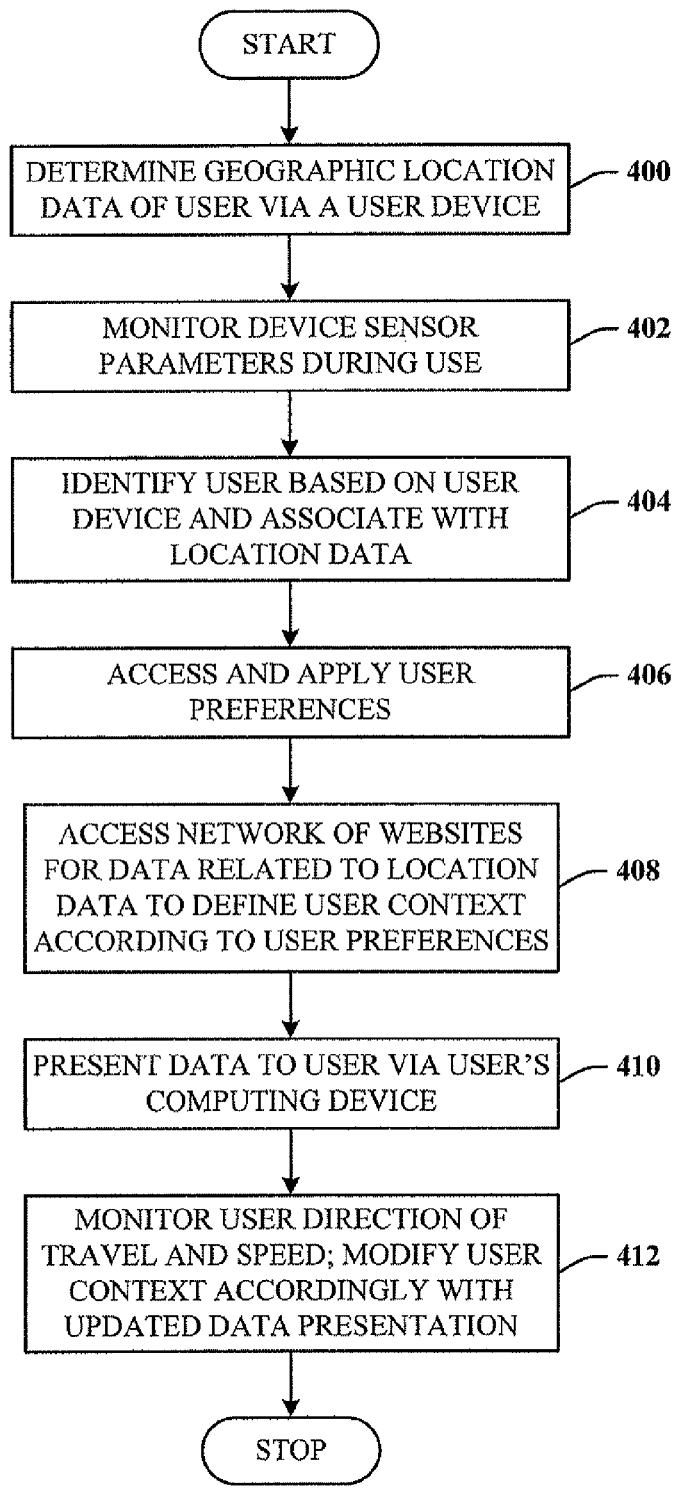
FIG. 4 illustrates a more detailed methodology of location and context awareness.

FIG. 4 illustrates a more detailed methodology of location and context awareness. At 400, the user's geographic location is determined. The portable device of the user may also employ a number of different sensors that facilitate more accurately determining the context of the user by way environmental parameters (e.g., temperature, pressure, and humidity), and the health of the user device (e.g., is it operating correctly, is it operating correctly while in a GPS shadow, . . . ). Thus, at 402, one or more device sensors and device parameters are monitored and processed accordingly. At 404, the user of the device is identified and associated with the location data. At 406, user preferences are accessed and applied. At 408, a network of websites is accessed for data related to the location data to define the user context according to the user preferences. At 410, the resulting data is presented to the user via a user device. At 412, the direction of the user is monitored, as well as the speed of the user. The user context is modified (or updated) accordingly, in addition to the data presented to the user.

Figure 5:
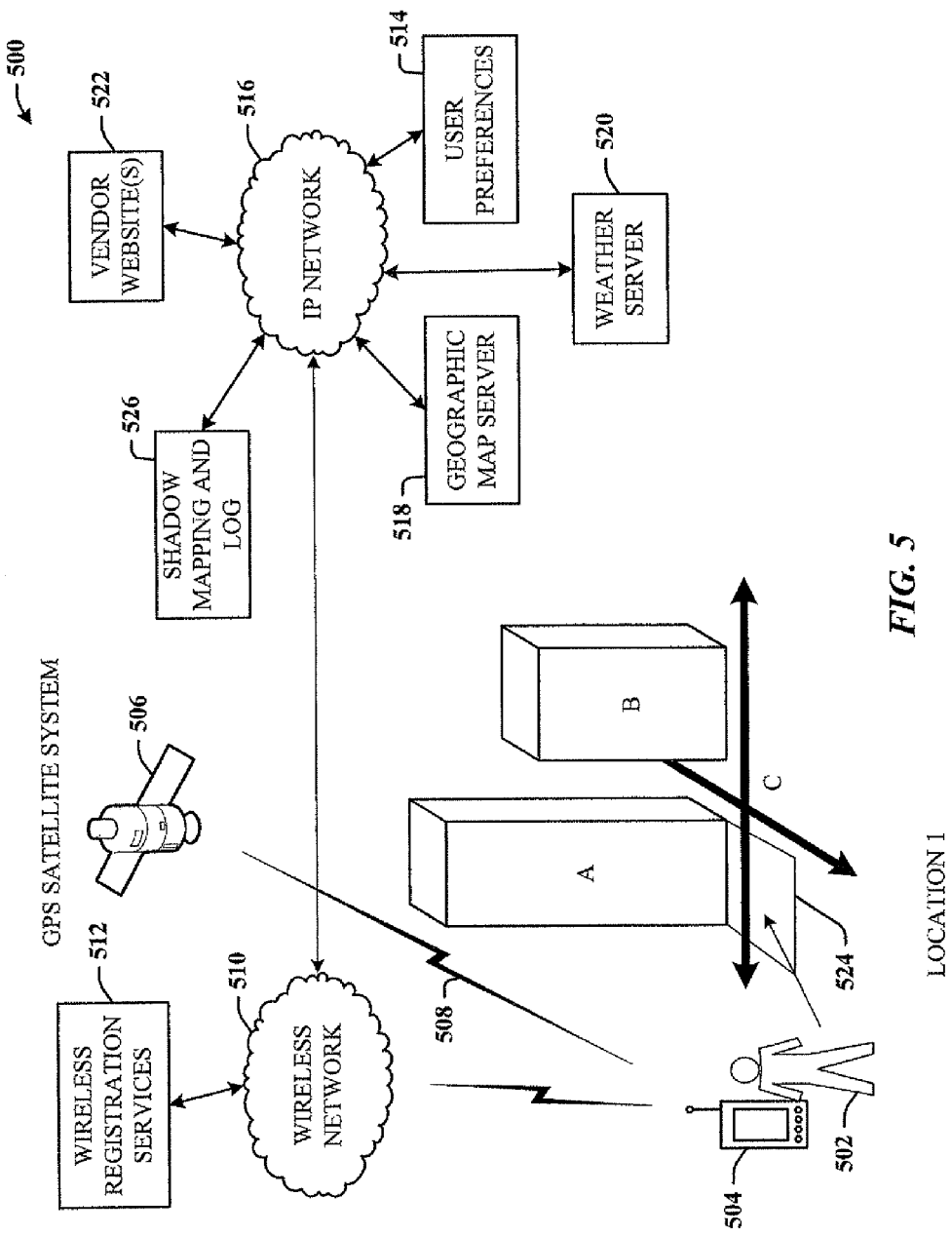
FIG. 5 illustrates a diagram of a system that employs location and context awareness.

FIG. 5 illustrates a diagram of a system 500 that employs location and context awareness. The system 500 employs GPS, such that a user 502 operating a device 504 can be located according to lat/long data derived therefrom. A GPS satellite system 506 continually communicates GPS signals 508 to the device 504 so that the device 504 can compute the lat/long data for the user. If the device 504 is a WAGPS device, the device 504 can register with a cellular network 510 having disposed therewith a wireless registration services system 512 that registers and uniquely identifies the user subscribed to that device 504. Once the user identity is known, as defined in association with the device 504, user preferences can be accessed from the registration services system 512 and/or a user preferences system 514 disposed on an IP network 516 (e.g., the Internet) connected to the cellular network 510. In any case, the user preferences can now be employed as a filter for data being presented to the user via the device 504 and subscribed services, for the way in which the device 504 may operate, and for other purposes, as desired, for example.

Once the user location coordinates are known, the coordinates can be used as search terms for search engines of the IP network 516. Thus, returned search links can be accessed according to some predetermined criteria and/or rules (e.g., use website associated with link A before the website associated with link B) thereby routing to further existing websites such as a geographic map server 518 that can convert the coordinates into streets and/or addresses, for example. Other websites can also be automatically accessed to obtain additional information such as weather information from a weather website 520, including temperature, humidity and barometric pressure data, if provided for the location of the user. It is to be appreciated that many different types of rules (or policies) can be implemented to cause automatic searching and linking of website data sources for the desired information. Such rules can be employed as part of the user preferences at the user preference website 514, as part of the subscriber preferences accessed at the registration services site 512, and/or even in the user device 504.

Given that the user location is now approximately known, the nearest street(s) and addresses can be obtained. Additionally, the direction and speed of the user 502 can also be computed. If the user 502 is moving in the direction of intersection C, business websites 522 (grouped together) of businesses (Company A and Company B) at that intersection or nearby can also be accessed for advertising information. If the user 502 has a history of shopping at these businesses, specials can be presented to the user 502 via the device 504 based on user preferences, availability of preferred products, reminders to the user of products to get when there, etc. The capabilities that can be employed for the user 502 and the businesses (A and B) when user context and location are known, are enormous.

If the user 502 should enter a GPS shadow 524, or it is determined from user course and speed that the user is about to enter the shadow 524, other data and operations can be processed. For example, a shadow mapping and log website 526 provides a database of shadow mappings that are associated with the structures (of companies A and B) that can be accessed such that when the user enters the GPS shadow 524, the device 504, operating under power management features, can control its GPS subsystem to enter a power standby mode to conserve power. Additionally, utilizing onboard inference technology, given the user's course and speed, it can be inferred that the device 504 should stay in standby mode for a calculated period of time based on data associated with the shadow, the likelihood that the user will be indoors at this geographic location, past history that there is a high likelihood that the user will be indoors for an estimated period of time, and based on the need of the user to purchase a product at the business, and so on. The number and complexity of parameters to be analyzed can be many.

Figure 6:
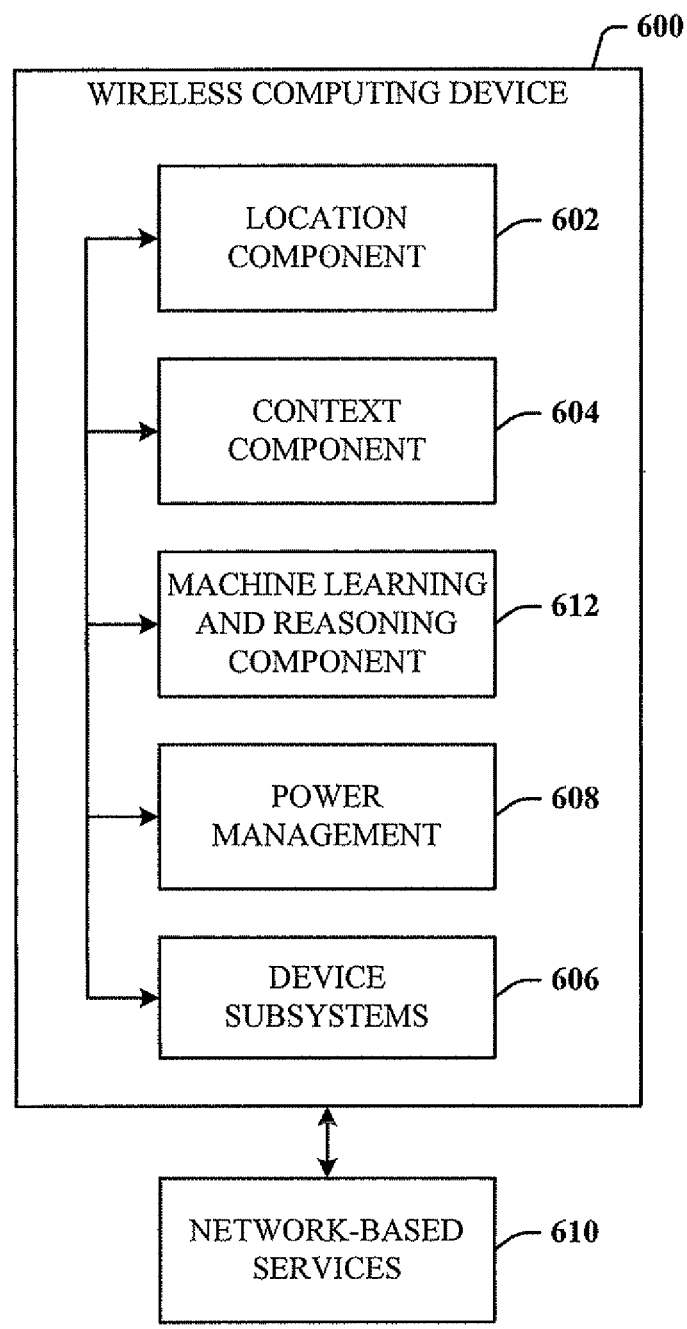
FIG. 6 illustrates a wireless computing device that operates in accordance with the subject innovation.

Referring now to FIG. 6, there is illustrated a wireless computing device 600 that operates in accordance with the subject innovation. The device 600 includes a location component 602 that determines the location data (e.g., lat/long coordinates) of the device 600 in accordance with a geographic location system (e.g., GPS). The location component 602 includes the software and hardware that facilitate calculating the location data for the device 600. The device also includes a context component 604 that processes all context-related data, including, but not limited to, streets, addresses, business information, environmental parameters, device health data, and so on. Device health information and environmental parameters can be processed according to onboard sensors as part of a device subsystems component 606 of the device 600 that measure temperature, humidity, ambient lighting, time of day, day of year, season, and barometric pressure, for example. Thus, sensor fusion of onboard and/or remote sensor data can be employed in the context awareness and location determination process of the invention.

A power management component 608 facilitates controlling power functions, for example, powering down the device 600 or subsystems thereof, or placing them in a standby mode for later wakeup. Power management can also control device systems and subsystems based on battery parameters, such as available battery life, type of battery, etc. As described supra, if the device 600 is brought into a communications shadow, where certain onboard subsystems are no longer effective, such subsystems can be controlled into a standby mode, or even powered down. The power management component 608 includes the hardware and software to provide such capabilities. As described herein, and in accordance with the invention, the wireless computing device 600 interfaces with a plurality of existing network-based services 610 via websites that provide coordinate-conversion data, weather information, user preferences, etc.

In this particular embodiment, the device 600 can include a machine learning and reasoning component 612 that employs probabilistic and/or statistical-based analysis to prognose or infer an action that a user desires to be automatically performed. The subject invention (e.g., in connection with selection) can employ various MLR-based schemes for carrying out various aspects thereof. For example, a process for determining what website to access based upon a number of search results can be facilitated via an automatic classifier system and process. Moreover, where the data is distributed over several network locations, and each location has the desired data, the classifier can be employed to determine which location to access. If the preferred website returns data at a much slower rate, or is offline, the MLR component 612 can facilitate determining how to proceed in order to obtain the desired data.

A classifier is a function that maps an input attribute vector, $x=(x1, x2, x3, x4, xn)$, to a class label class(x). The classifier can also output a confidence that the input belongs to a class, that is, $f(x)=confidence(class(x))$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to predetermined criteria which shadow map(s) to employ based on course and speed of the device 600, and which businesses, streets and addresses to return based on the location data, and environmental data.

As described supra, inferences can be made, and operations performed, based on numerous pieces of information. For example, when a user shops in a general location many different times, historical information can be generated about a route the user may take to arrive at the location, the communications shadows that the user typically intersects on that route, the average time spent on the route and at various stops along the route, items purchased and where, money spent (and on what products), and so on. As the database of information accumulates for this user, the data is analyzed to determine converging patterns such that inferences can be made. Thus, expectations based on habits and frequencies of access can be targeted by companies and businesses along the route. Reminders, whether manually entered by the user or automatically generated based on past activities, can be generated or suggestions made based on the time of past purchases and preferred products.

As further described supra, power management capabilities can take into consideration similar types of user activity data. For example, if the user typically spends several hours in a business district shopping, working, etc., it can be inferred in accordance with some level of confidence that in future instances, the device 600 should be controlled accordingly (e.g., controlled to standby or power-down mode) if the user enters that location again. Similarly, if it is determined that the user's course and speed is normally associated with riding in a vehicle, and that the user typically rides a vehicle at this location, the device 600 can be set to standby mode until such time that the ride normally terminates, as measured from previous ride data. Power management can include different modes of hibernation based on use, motion, battery life, etc. In another implementation, the effect of sensor failure of one or more sensors (e.g., due to sensor failure, battery failure or condition) can be analyzed and computed to determine the cost to the overall mission. In yet another example, where a camera imager is employed, pixel usage can be managed based on the application, location, and context. Thus, instead of using all five megapixels, only half of the pixels are employed, for example.

The MLR component 612 can also be employed to build probabilistic models, such as graphical probabilistic models like Bayesian networks, that can be used to infer probability distributions over one or more persons' activities. The probability distributions can be inferred by integrating multiple sources of information including sensed location, reliability of location (e.g., via satellite signal strengths), resources such as Web information and yellow pages information about the address, velocity, velocity dynamics (e.g., how velocity has recently changed), barometric pressure, temperature, pattern of the loss of a GPS signal (e.g., velocity went to zero and then the GPS signal was lost), time of day, day of week, and so on.

Time can be considered since an activity or the likely activity (under uncertainty) was carried out, in a "satiation model," e.g., if a person just likely stopped at a restaurant (e.g., slowed down to a stop and GPS signals lost at noon near a bank of restaurants, per yellow pages mapped to address where signal lost) and likely ate lunch, then it is unlikely the person is stopping at a restaurant again after leaving the likely lunch spot and then stops, and the GPS signal lost at a location associated with a hardware store and a restaurant. A lower probability can then be assigned to the restaurant for the second stop and higher to the hardware store. Additionally, in retrospective (e.g., even near real-time), if a stop is quick such that the traveler is likely not eating but doing something else, a lower probability can then be assigned.

Another example is if a user stops at a likely gas station, then stops a couple of hours later at a place that cannot be discriminated precisely, but that includes a gas station, a flower shop, and other retail shops, the likelihood that a user is buying gas again is low, given that a car tank holds enough gas to tide the driver over for a couple of days. This satiation model can be part of the probabilistic inference.

Figure 7:
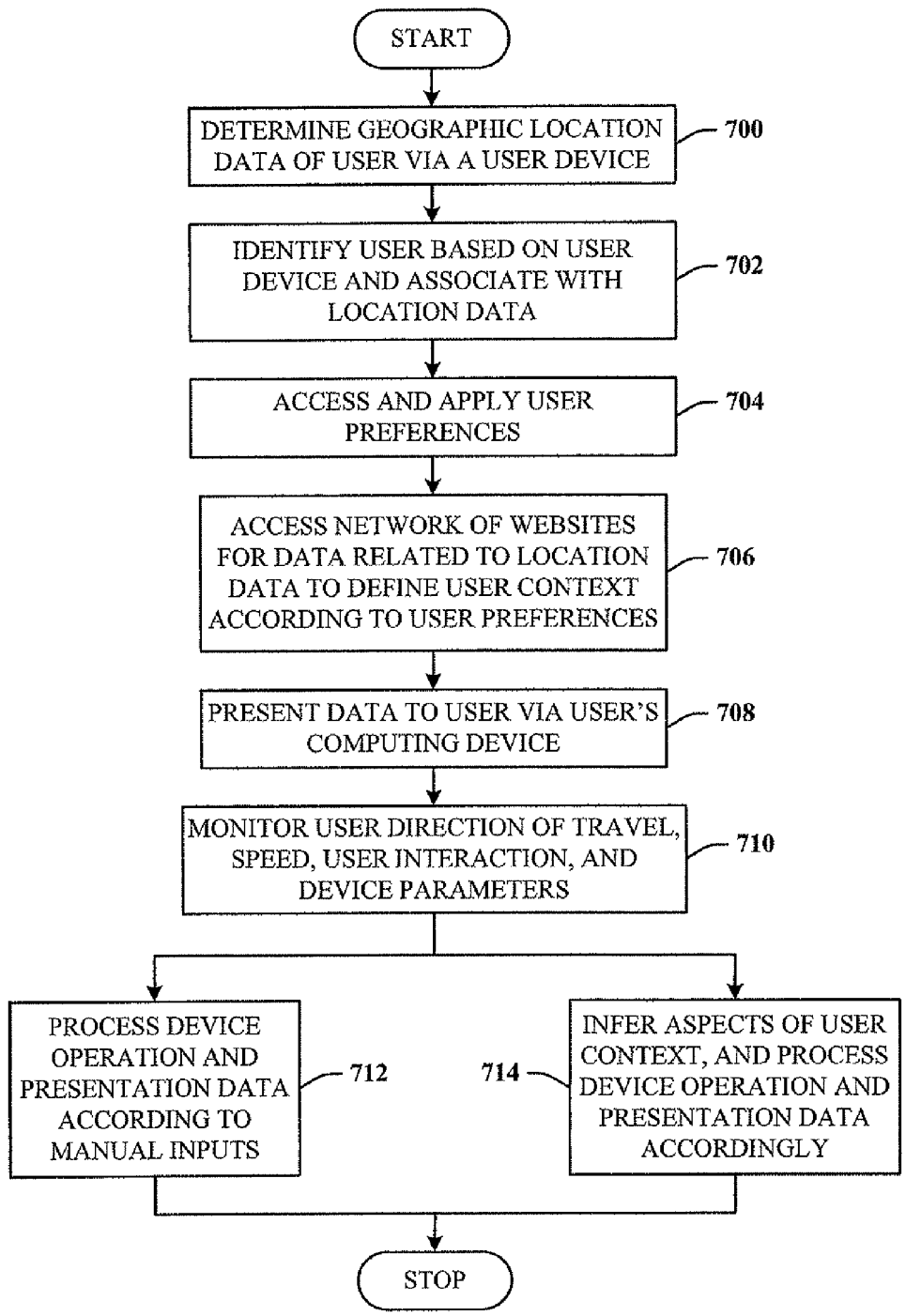
FIG. 7 illustrates a methodology of facilitating location and context awareness.

FIG. 7 illustrates a methodology of facilitating location and context awareness. At 700, the geographic location of the user is determined. At 702, the user is identified and associated with the location data. At 704, user preferences are accessed and applied. At 706, Internet websites are accessed for the desired data related to user location and to facilitate defining user context. At 708, data is presented to the user via the wireless computing device. At 710, user course and speed are computed and monitored, along with user interaction and device parameters. At 712, device operation and the presentation of data can be initiated according to manual selections of the user. Alternatively, and in accordance with AI capabilities, aspects of user context, device operation, and data presentation can be inferred from any number of different data, as indicated at 714.

FIGS. 8-14 support a description of novel applications that use existing location data on the Internet in conjunction with position information from a GPS receiver. In this way, the deployment costs of creating a database of location information are avoided, relying instead on what is already available. These applications show that it is possible to create useful location-based services using existing location data.

Figure 8:
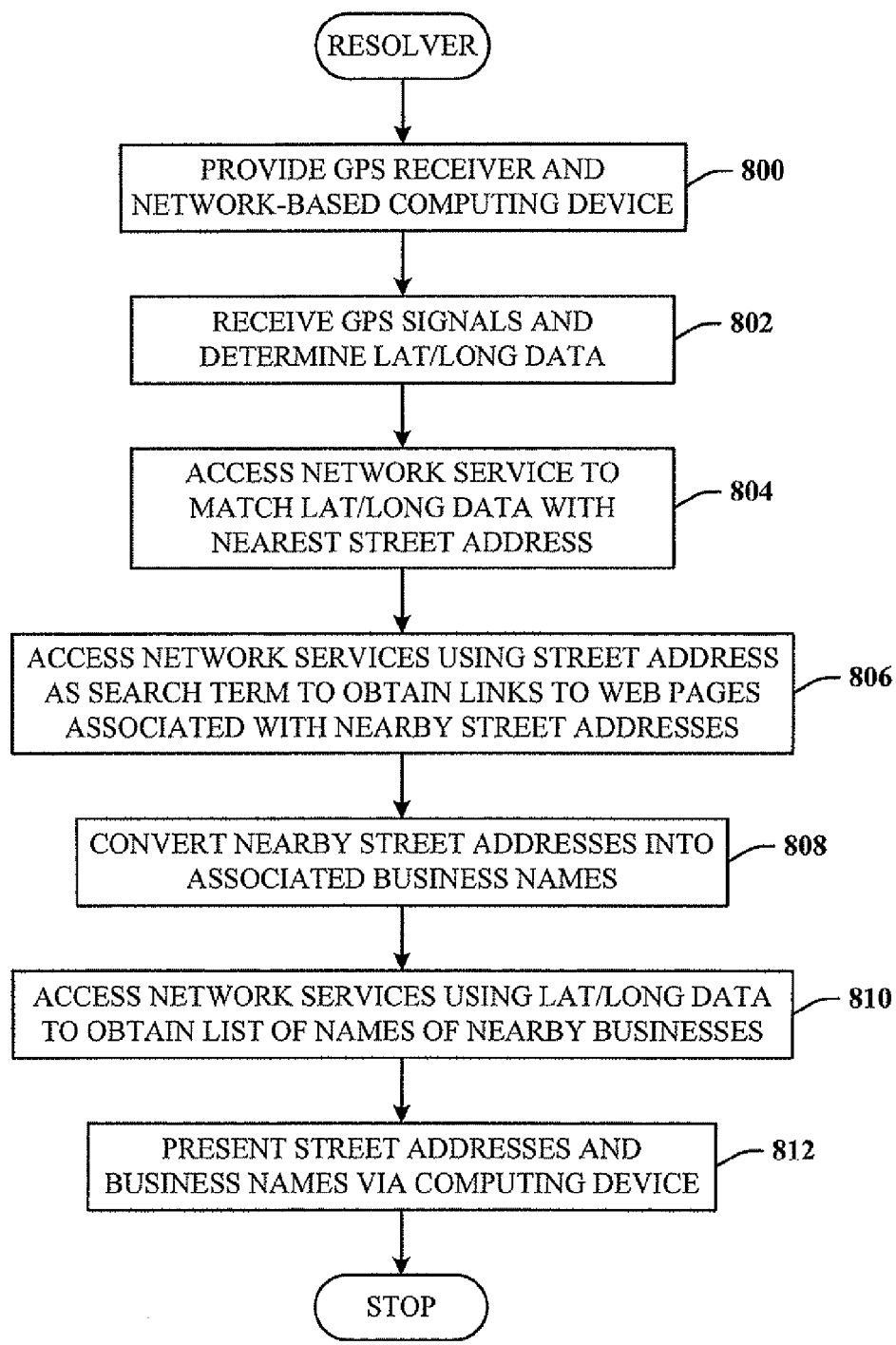
FIG. 8 illustrates a methodology of employing existing network data to convert lat/long data for web searches that return web pages relevant to the user's immediate surroundings.

FIG. 8 illustrates a methodology of employing existing network data to convert lat/long data for web searches that return web pages relevant to the user's immediate surroundings. This first application, a "context resolver", infers a user context based on his or her GPS coordinates, queries from an Internet mapping service, and general Internet searches. At 800, a GPS receiver is provided along with a computing system that can access a network of existing websites. At 802, GPS signals are received to determine the lat/long location information. At 804, the lat/long data is used as search engine search terms to access a website that converts it to return a nearest street address. At 806, the street address is used a search data to return links to web pages associated with nearby street addresses. At 808, the nearby street addresses are converted into associated business names by again, accessing a website that provides such a service. At 810, the lat/long data is used to filter the list of nearby businesses of the street addresses down to a list of names nearby businesses relevant to the user. At 812, the street addresses and business names are then presented to the user via the computing device.

Figure 9:
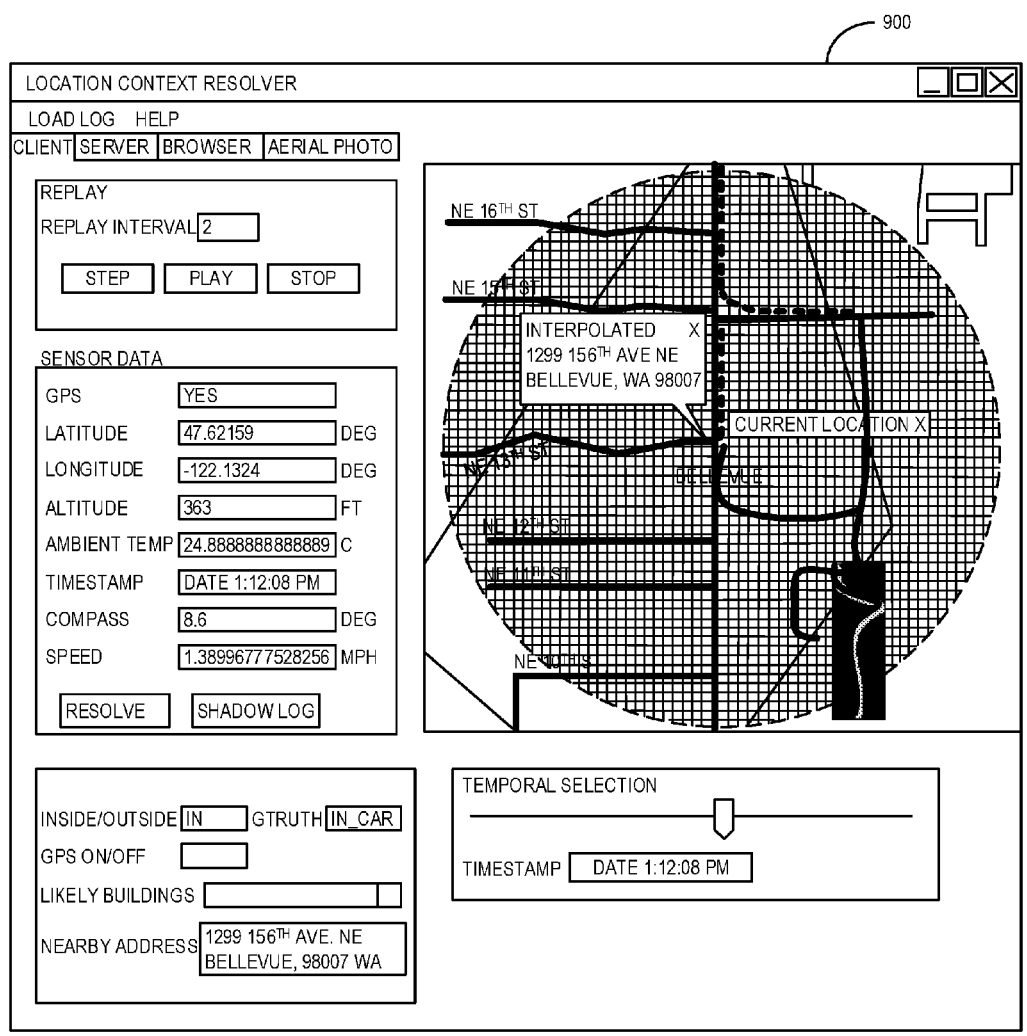
FIG. 9 illustrates a screenshot of client and server parts that process lat/long data points measured from an urban drive with a GPS receiver providing recordings at several different locations.

The first application is designed to give information about a mobile user's immediate surroundings. It is assumed the user is equipped with a GPS receiver and Internet-connected computer. Beginning with the lat/long data, software can be employed to compute the nearest street address. FIG. 9 illustrates a screenshot 900 of a client and server parts that process lat/long data points measured from an urban drive with a GPS receiver providing recordings at several different locations. Each measured location can be resolved, which triggers the street address lookup, and the results of which are shown in a popup window on the map.

Figure 10:
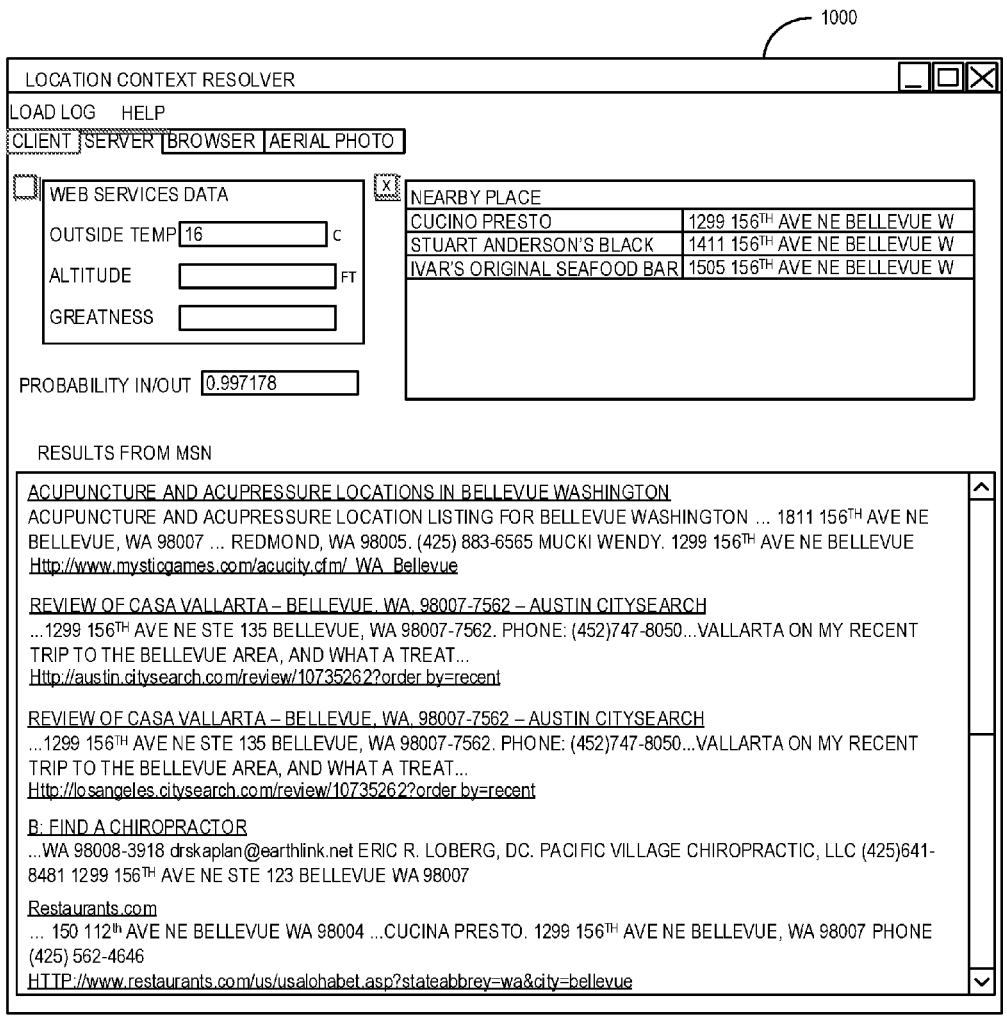
FIG. 10 illustrates a screenshot giving the result of a search automatically performed on the resolved street address.

The conversion from lat/long to street address is significant, because the street address serves as a good search term for Internet searches. FIG. 10 illustrates a screenshot 1000 giving the result of a search automatically performed on the resolved street address. The search results give links to web pages that contain the nearby street address, resulting in entries for a nearby acupuncturist, chiropractor, and restaurant.

Figure 11:
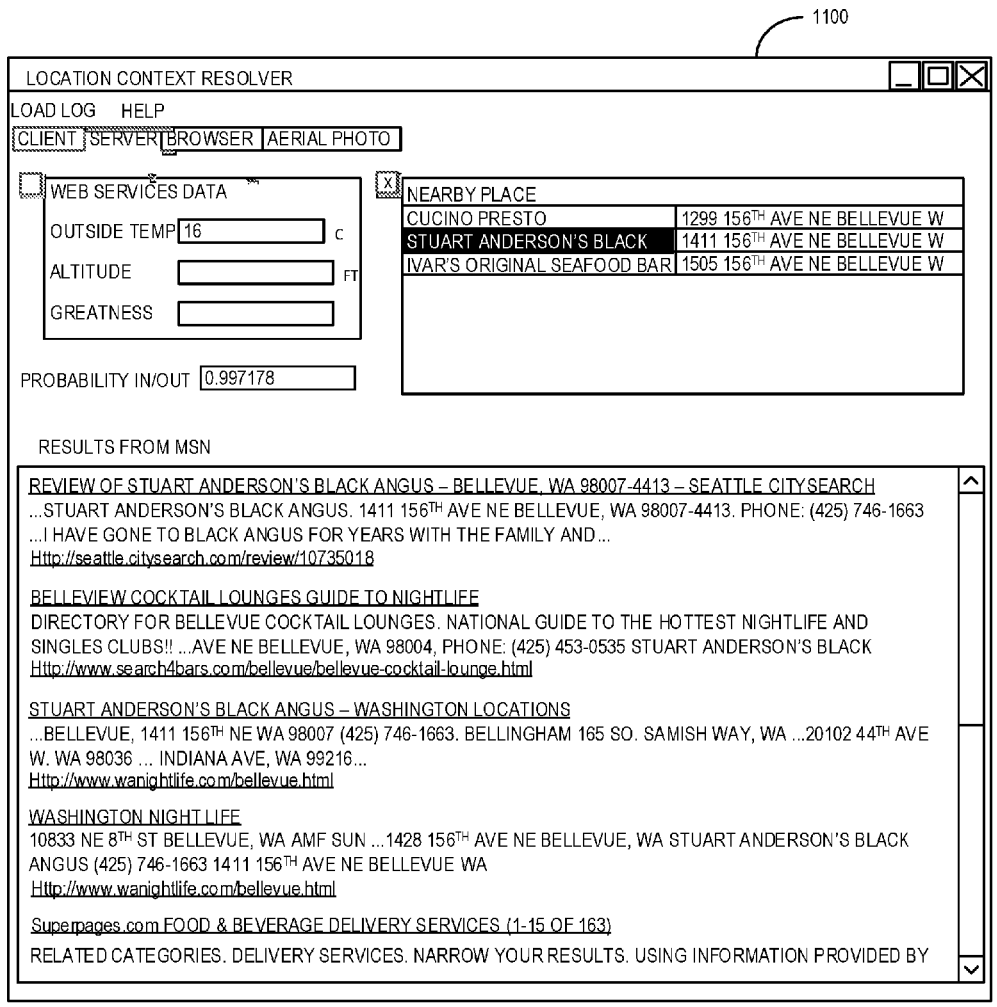
FIG. 11 illustrates a screenshot of lookup results for three nearby restaurants.
Figure 12:
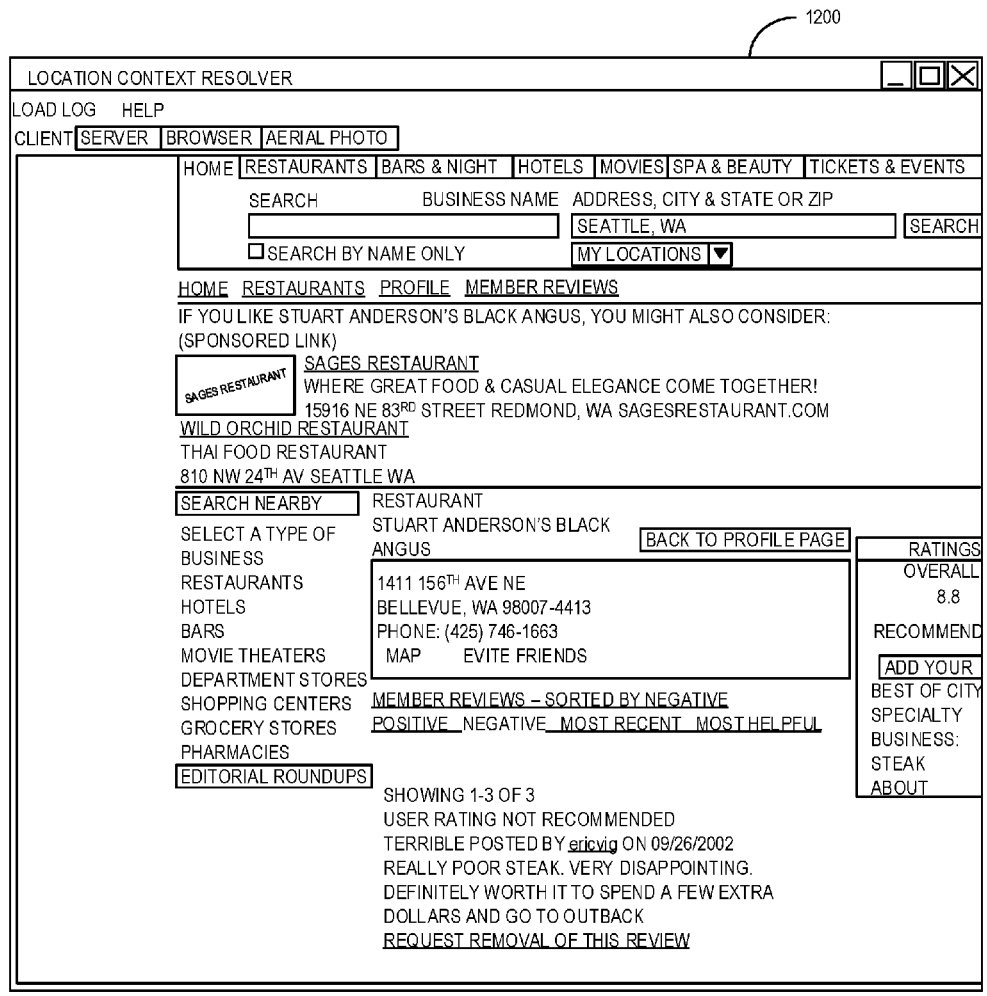
FIG. 12 illustrates a screenshot of the search results which gives positive and negative reviews of the restaurant.

Not all relevant web pages contain a street address that matches the search terms. Thus, lat/long data can also be converted into a list of nearby businesses. An existing web service is accessed that uses a database of business locations which are categorized by type, such as food stores, automobile dealers, and restaurants. FIG. 11 illustrates a screenshot 1100 of lookup results for three nearby restaurants, one of which is called "Stuart Anderson's Black Angus". After the user clicks on this result, the context resolver application automatically runs another network search using the restaurant name as a search term. FIG. 12 illustrates a screenshot 1200 of the search results which gives positive and negative reviews of the restaurant. Starting with GPS coordinates, the user can find this review page with only two mouse clicks using the context resolver application.

The first application includes preprocessing step of converting the numerical lat/long data into a street address or business name, which allows the local search to be completely automated based on the GPS receiver. The first application requires no special databases, but instead exploits the extensive amount of data already available on the Internet. It is unique in that it uses a measured position to ultimately index into web pages about nearby things.

A second application includes pointing a pose-sensitive query device at a scene of interest and obtaining a list of businesses that are situated along that direction. The second application is based on a device (or a combination of intercommunicating devices) containing a GPS receiver, electronic compass, and network connection. The user physically points the device at something and issues a query. The application responds with a list of businesses or other points of interest along the direction of pointing. The second application uses a network-based mapping service to find businesses in the direction of pointing, using the GPS coordinates and the electronic compass. It is also allows a mobile user to point toward an outside object and discover what is inside or behind it.

Figure 13A:
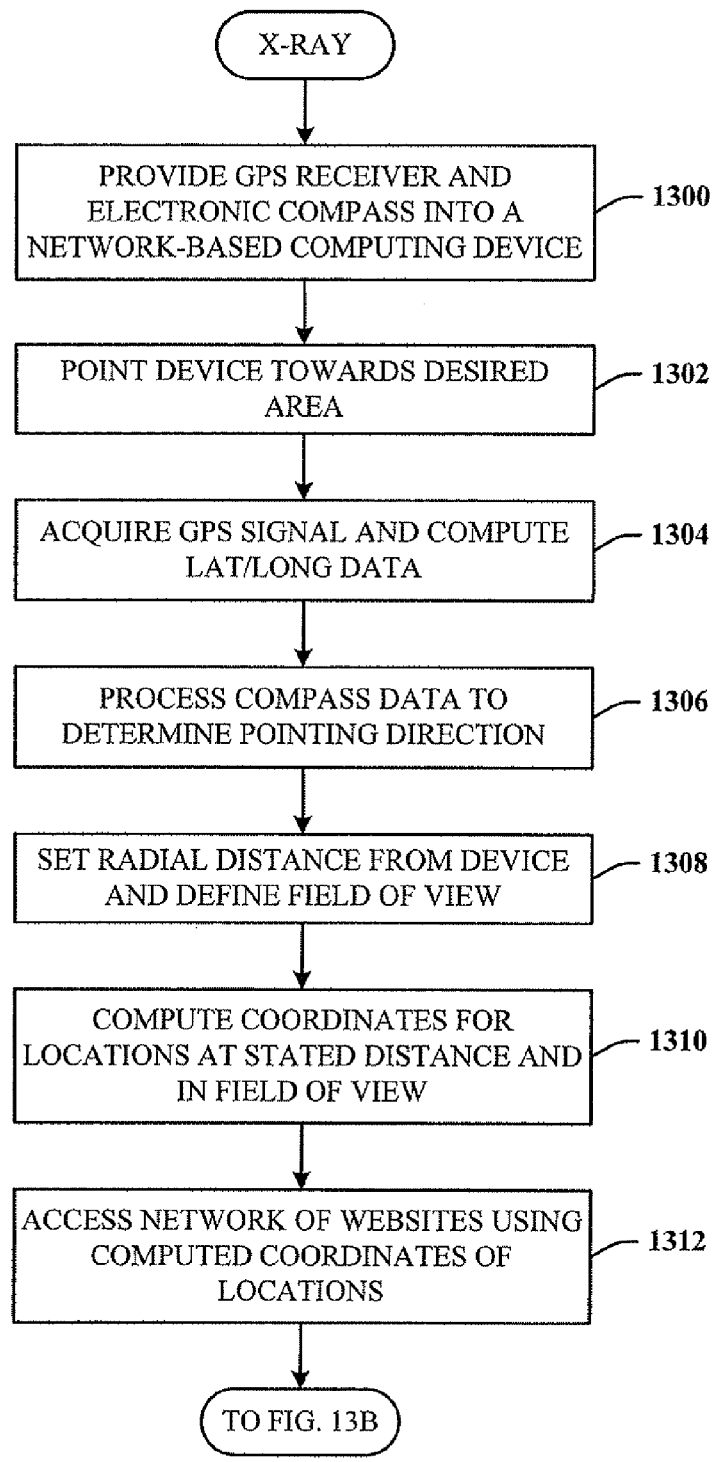
FIG. 13A and FIG. 13B illustrate a methodology of obtaining context information using a pose-sensitive query device.
Figure 13B:
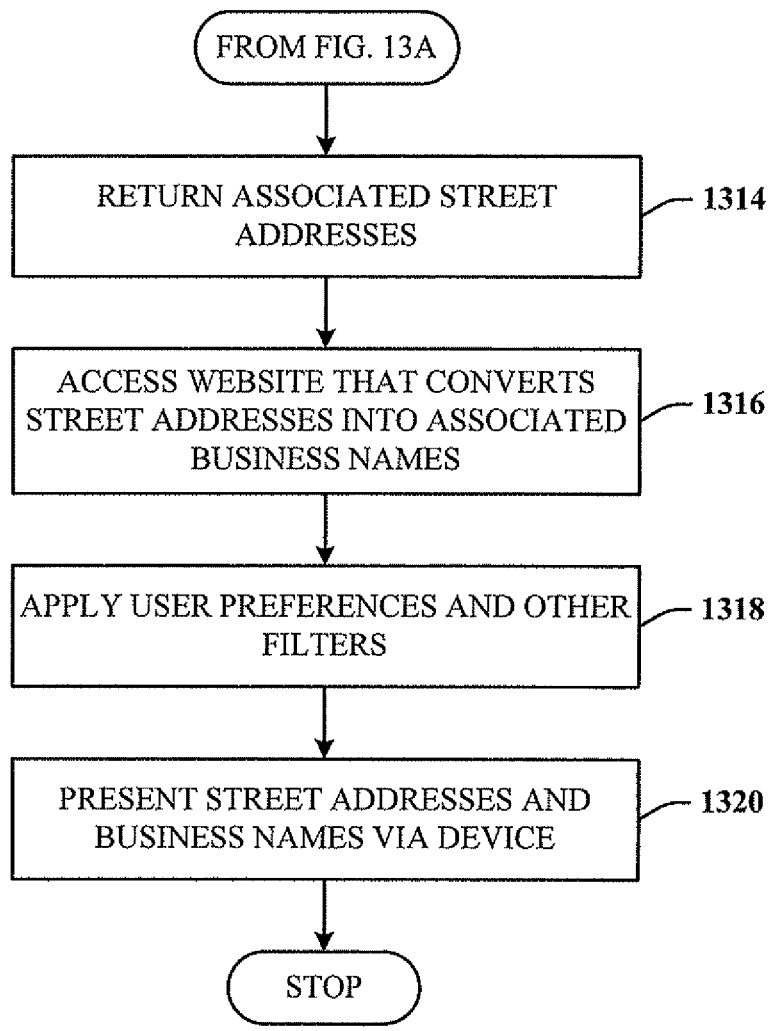

Accordingly, FIG. 13A and FIG. 13B illustrate a methodology of obtaining context information using a pose-sensitive query device. At 1300, a computing device is provided that includes a GPS receiver and an electronic compass, and can access a network (e.g., the Internet). At 1302 the device is pointed towards a desired area. At 1304, a GPS signal is acquired and the lat/long data of the device is computed. At 1306, compass data is processed to determine the pointing direction. At 1308, the radial distance that the user chooses to investigate is set. In other words, if the user chooses to search for businesses that are a half mile away, the user would not want information for all businesses that are be beyond the half mile distance to clutter the search results. Moreover, the user may not want to search for businesses that are less than a quarter mile away. Thus, the user can set a radial range of, for example, all businesses within the filed of view that are within 500 feet (near and far) of a location one-half mile away from the user.

At 1310, coordinates are computed for the desired location or range of locations on the radial line from the user. At 1312, using these computed coordinates, a search of network websites is conducted. Referring now to FIG. 13B, street addresses are returned that are associated with the coordinates provided, as indicated at 1314. At 1316, the street addresses are used as search terms that return links to websites that can convert the addresses into associated business names. At 1318, filters can be applied, such as user preferences, to limit or narrow the amount of data returned to the computing device for processing. At 1320, a final list of street addresses and business names are presented to the user via the computing device. An ideal computing device platform would be a cell phone with GPS capability, an electronic compass, and Internet access.

Figure 14:
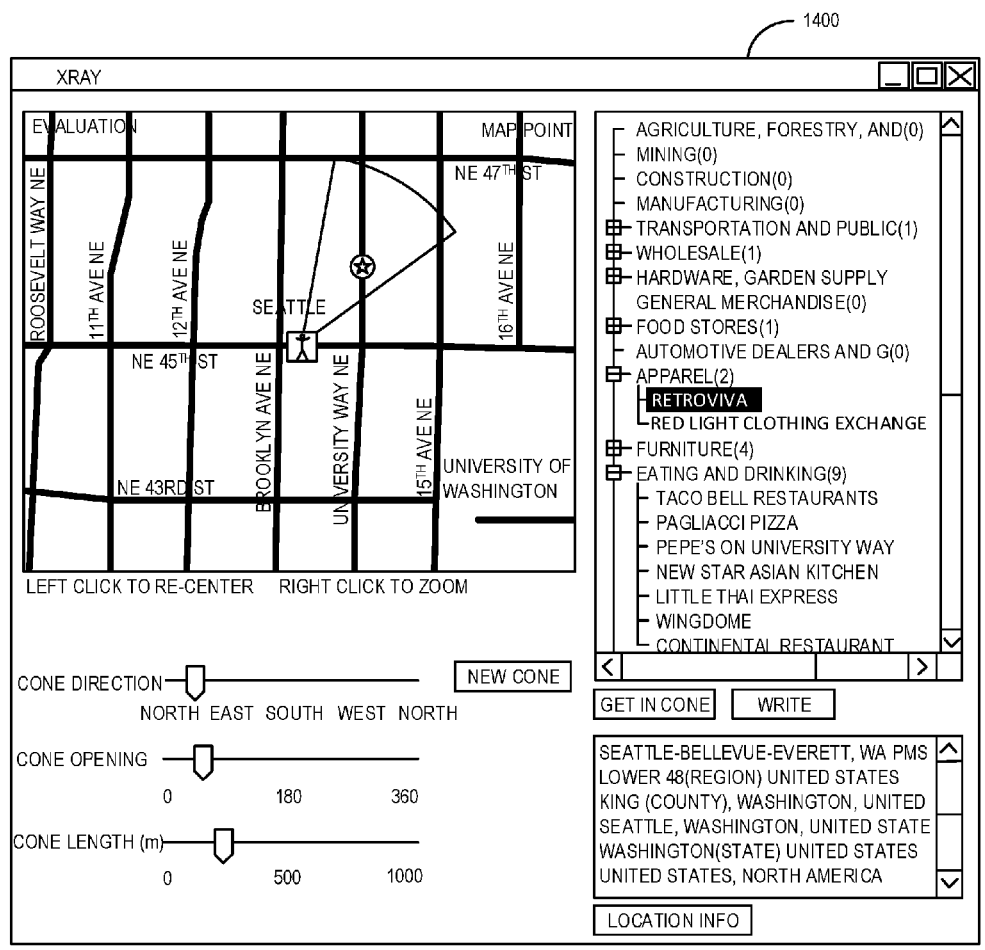
FIG. 14 illustrates a screenshot of a user interface of the second application that employs a pose-sensitive query device.

FIG. 14 illustrates a screenshot 1400 of a user interface of the second application that employs a pose-sensitive query device. In this example, the device has been pointed toward a street that the user cannot yet see, and its "field of view" (or query cone) has been adjusted to query over the length of the unseen block. The list at the right shows different categories of items returned from a website database. The "Apparel" and "Eating and drinking" categories have been expanded to show the names of places inside the query cone. Clicking on one of these places puts an icon on the map at its location. Using this program, users can quickly get a sense of what is around them by simply pointing in a direction of interest. As with the first application above, this application also relies on a rich, existing database of places, meaning that it works "out of the box" with no deployment costs.

Figure 15:
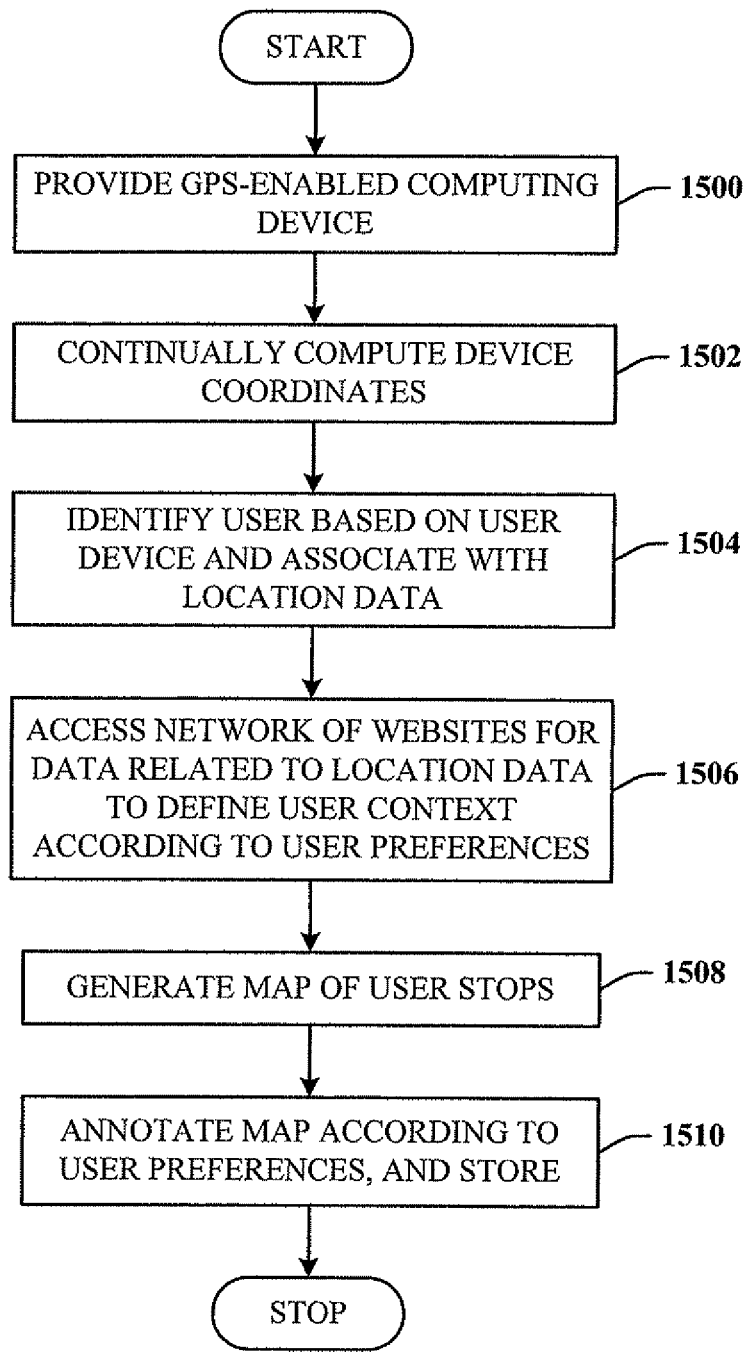
FIG. 15 illustrates a methodology of context mapping.

Referring now to FIG. 15, there is illustrated a methodology of context mapping. A third application builds a map and clickable links to help automatically annotate a trip based on GPS coordinates. At 1500, a GPS-enabled computing device is provided. It is not required that the GPS capability be integrated into the computing device; however, such combined capabilities provide a much more convenient application of the subject invention. At 1502, the computing device continually monitors its location using GPS, and processes the GPS signals to generate lat/long coordinates. At 1504, the device user is identified and associated with the location data. At 1506, the computing device is employed to access a network of existing websites (e.g., the Internet), using the lat/long coordinates as search terms to find websites that process the coordinates. User preferences, as accessed, can also be used to filter and further define the user context at this location. In other words, for each set of coordinates, the user context can be defined in terms of nearby streets, nearby businesses, environment, and so on. At 1508, the context information is used to generate a map of where the user has been, and in more robust implementations, predictions on where the user is likely to head. At 1510, the map can be annotated according to user preferences, and stored.

It is to be appreciated that many data aspects of the subject invention can be cached at various locations for faster access and processing. For example, where is it known that the user is generating activity via device communications, location information processing, etc., some of the existing data being processed can be cached in the user device. Additionally, or alternatively, caching can occur at a website that stores user preferences. Still further, a website can be designed specifically for the purpose of enabling high-speed data processing and caching to facilitate various aspects of the subject invention.

Figure 16:
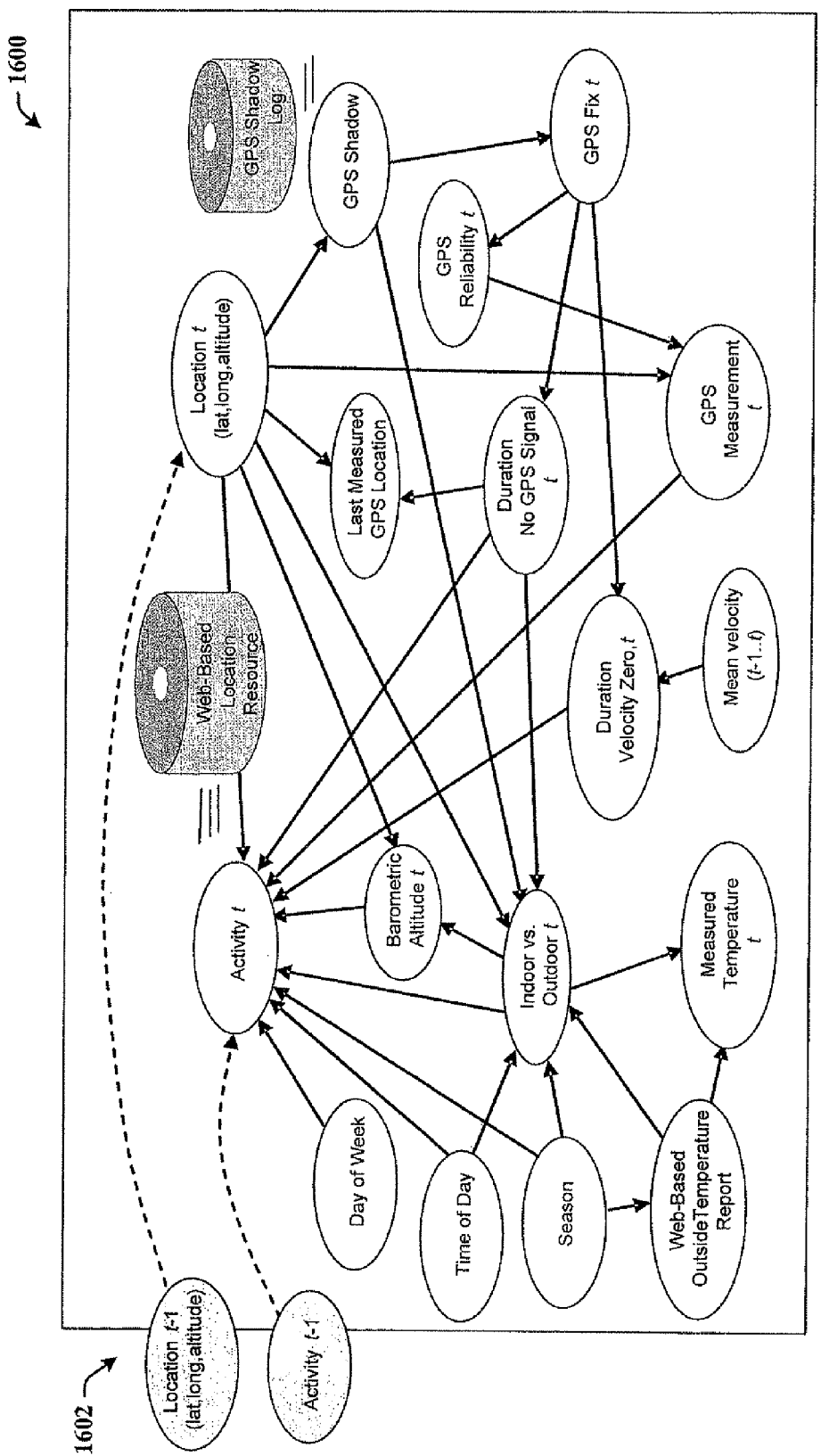
FIG. 16 illustrates another but more detailed dynamic Bayesian network for inferring location and activity, employing Web-based location resources.

FIG. 16 illustrates another but more detailed dynamic Bayesian network 1600 for inferring location and activity, employing Web-based location resources. The probabilistic dependencies among random variables highlight the influences of multiple sources of contextual evidence on the probability distribution over activities and location. Web-based location resources provide evidential updates about activities. The model considers variables representing the likelihood that a user is indoors versus outdoors as a function of multiple variables including differences in temperature indoors and outdoors, GPS fix, and a log of known GPS shadows. Multiple variables also update the probability distribution over the current location as a function of multiple sources of information.

Semantic content associated with locations on the Web can provide rich sources of evidence about users' activities over time. General probabilistic models can be provided with the capability to fuse multiple sources of information. Such models can be used to perform inferences about a user's activities from the historical and short-term geographic location data (e.g., GPS), as well as extended sensing with such information as temperature, barometric pressure, ambient light and sound, and Web data. Web content can be used to update, in an automated manner, a set of key resources and venues available at different locations, providing Bayesian dependency models with sets of resources that are coupled to an ontology of activities (e.g., shopping, restaurants, recreation, government offices, schools, entertainment, . . . ). Such information can be used as a rich source of evidence in a probabilistic model that computes the likelihood of different plausible activities.

Inferences can further take into consideration the dwelling of a user at a location with zero or small velocities and the complete loss of GPS signals at particular locations for varying periods of time, indicating that a user has entered a structure the blocks receipt of GPS signals. The timing, velocity, and frank loss of signal after a slowing of velocity provide rich evidence about a user's interests or entries into different proximal buildings and structures, as characterized by the content drawn from the Web about resources in the region of the last seen GPS coordinates. Such reasoning can be enhanced by a tagged log of prior activities noted by a user. Reasoning about losses of GPS signal can take into consideration a log of known "GPS shadows," that are not associated with being inside buildings, such as those occurring inside "urban valleys," as GPS access is blocked by tall structures. Rich probabilistic models of activity and location based on multiple sources of information, including information available from the Web and from logs of prior activities and GPS availability.

FIG. 16 displays a time slice of a more general dynamic Bayesian network model, showing probabilistic dependencies among key measurements and inferences. Server icons signify access of information from the Web about local resources as well as access from a store of known GPS shadows. The model is designed to make inferences about the probability distribution over a user's activities and over the location of a user, even when GPS signals are unreliable or lost temporarily. Sub-inferences include computation about whether a user is indoors or outdoors, employing information about the loss of GPS signals, a log of GPS shadows, information about local resources to the current location, and sensed temperature.

Here, two variables 1602 from an adjacent, earlier time slice are illustrated to highlight the potential value of including dependencies among variables in adjacent time slices. The variables 1602 include latitude, longitude and altitude, and activity at time t−1. Such information is fed forward to an activity t. The activity t receives other information, including day of week, time of day, season, indoor versus outdoor, barometric altitude, duration a velocity zero, GPS measurement, duration when no GPS signal, and access to a Web-based location source.

The indoor versus outdoor node receives input from the time of day node, season node, a Web-based outside temperature report, a location node for (lat,long,alt) at time t, GPS shadow information, and duration when no GPS signal is received. The measured temperature node received input from the Web-base outside temperature report node, and indoor versus outdoor node. The barometric altitude node receives input from the location node and the indoor versus outdoor node. The duration velocity zero node receives input from a mean velocity node and a GPS fix node. The GPS measurement node receives input from the location node and a GPS reliability node. The GPS reliability node receives input from the GPS fix node. The GPS shadow node receives input from the location node. A GPS shadow log is provided that forms the database for all GPS shadows detected.

Knowledge of a user's raw (latitude, longitude) is not normally very useful. However, with publicly available databases, location measurements can be converted into useful information. Applications utilize raw GPS readings, and using publicly available Web data, produce useful information. The Web (or Internet), in addition to other sources of information, can be utilized to support rich probabilistic inferences about a user's activities and location. Such inferences can provide a window into a user's activities as well as access to location information even when GPS fixes become erroneous or are lost completely. Indeed, such models can take losses of GPS signal as valuable evidence for making inferences about activities and location.

Figure 17:
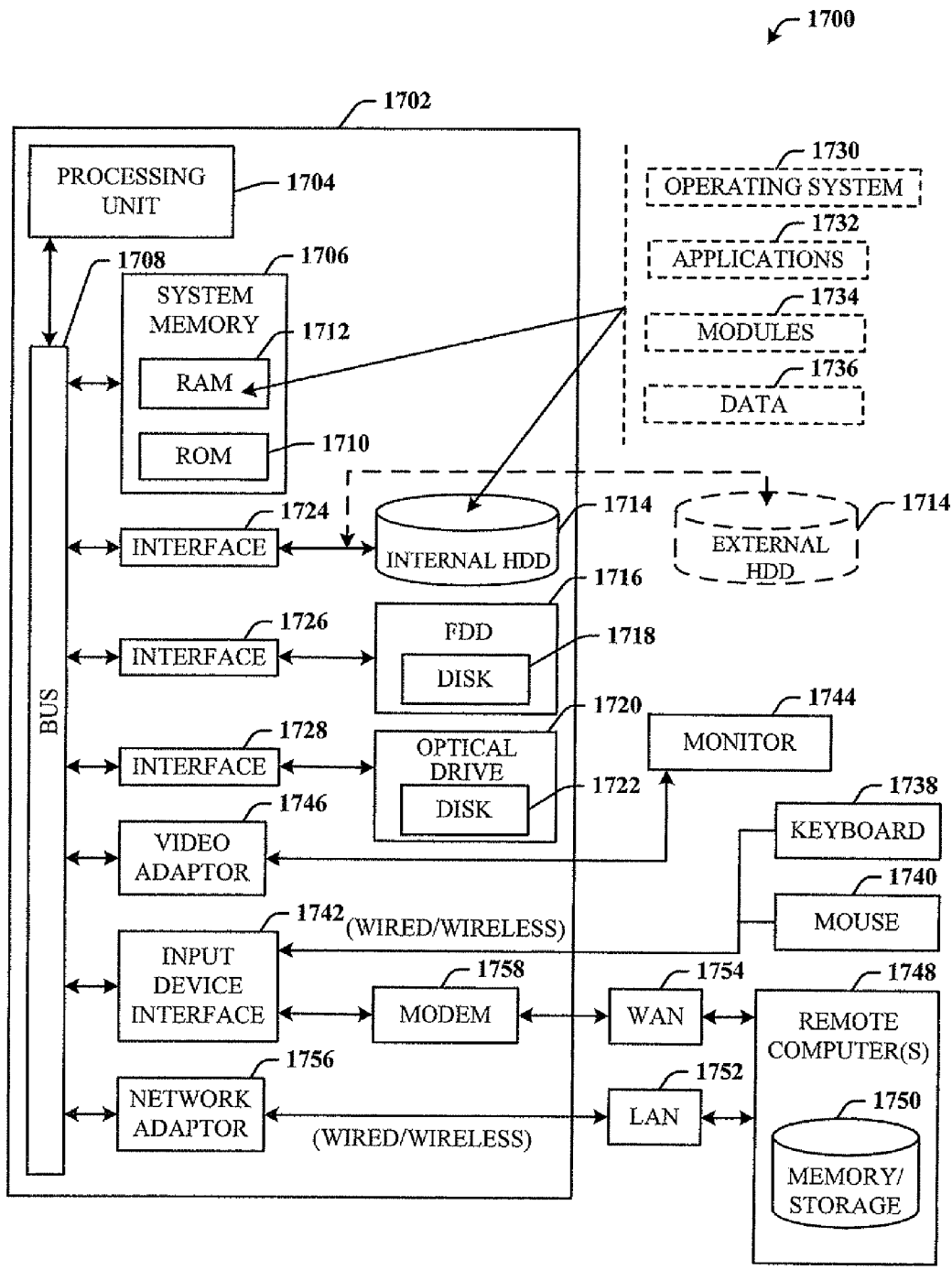
FIG. 17 illustrates a block diagram of a computer operable to execute the disclosed architecture.

Referring now to FIG. 17, there is illustrated a block diagram of a computer operable to execute the disclosed architecture. In order to provide additional context for various aspects of the subject invention, FIG. 17 and the following discussion are intended to provide a brief, general description of a suitable computing environment 1700 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 17, the exemplary environment 1700 for implementing various aspects of the invention includes a computer 1702, the computer 1702 including a processing unit 1704, a system memory 1706 and a system bus 1708. The system bus 1708 couples system components including, but not limited to, the system memory 1706 to the processing unit 1704. The processing unit 1704 can be any of various commercially available processors. Dual microprocessors and other multi-processor architectures may also be employed as the processing unit 1704.

The system bus 1708 can be any of several types of bus structure that may further interconnect to a memory bus (with or without a memory controller), a peripheral bus, and a local bus using any of a variety of commercially available bus architectures. The system memory 1706 includes read-only memory (ROM) 1710 and random access memory (RAM) 1712. A basic input/output system (BIOS) is stored in a non-volatile memory 1710 such as ROM, EPROM, EEPROM, which BIOS contains the basic routines that help to transfer information between elements within the computer 1702, such as during start-up. The RAM 1712 can also include a high-speed RAM such as static RAM for caching data.

The computer 1702 further includes an internal hard disk drive (HDD) 1714 (e.g., EIDE, SATA), which internal hard disk drive 1714 may also be configured for external use in a suitable chassis (not shown), a magnetic floppy disk drive (FDD) 1716, (e.g., to read from or write to a removable diskette 1718) and an optical disk drive 1720, (e.g., reading a CD-ROM disk 1722 or, to read from or write to other high capacity optical media such as the DVD). The hard disk drive 1714, magnetic disk drive 1716 and optical disk drive 1720 can be connected to the system bus 1708 by a hard disk drive interface 1724, a magnetic disk drive interface 1726 and an optical drive interface 1728, respectively. The interface 1724 for external drive implementations includes at least one or both of Universal Serial Bus (USB) and IEEE 1394 interface technologies. Other external drive connection technologies are within contemplation of the subject invention.

The drives and their associated computer-readable media provide nonvolatile storage of data, data structures, computer-executable instructions, and so forth. For the computer 1702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1712, including an operating system 1730, one or more application programs 1732, other program modules 1734 and program data 1736. All or portions of the operating system, applications, modules, and/or data can also be cached in the RAM 1712. It is appreciated that the invention can be implemented with various commercially available operating systems or combinations of operating systems.

A user can enter commands and information into the computer 1702 through one or more wired/wireless input devices, e.g., a keyboard 1738 and a pointing device, such as a mouse 1740. Other input devices (not shown) may include a microphone, an IR remote control, a joystick, a game pad, a stylus pen, touch screen, or the like. These and other input devices are often connected to the processing unit 1704 through an input device interface 1742 that is coupled to the system bus 1708, but can be connected by other interfaces, such as a parallel port, an IEEE 1394 serial port, a game port, a USB port, an IR interface, etc.

A monitor 1744 or other type of display device is also connected to the system bus 1708 via an interface, such as a video adapter 1746. In addition to the monitor 1744, a computer typically includes other peripheral output devices (not shown), such as speakers, printers, etc.

The computer 1702 may operate in a networked environment using logical connections via wired and/or wireless communications to one or more remote computers, such as a remote computer(s) 1748. The remote computer(s) 1748 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1750 is illustrated. The logical connections depicted include wired/wireless connectivity to a local area network (LAN) 1752 and/or larger networks, e.g., a wide area network (WAN) 1754. Such LAN and WAN networking environments are commonplace in offices and companies, and facilitate enterprise-wide computer networks, such as intranets, all of which may connect to a global communications network, e.g., the Internet.

When used in a LAN networking environment, the computer 1702 is connected to the local network 1752 through a wired and/or wireless communication network interface or adapter 1756. The adaptor 1756 may facilitate wired or wireless communication to the LAN 1752, which may also include a wireless access point disposed thereon for communicating with the wireless adaptor 1756.

When used in a WAN networking environment, the computer 1702 can include a modem 1758, or is connected to a communications server on the WAN 1754, or has other means for establishing communications over the WAN 1754, such as by way of the Internet. The modem 1758, which can be internal or external and a wired or wireless device, is connected to the system bus 1708 via the serial port interface 1742. In a networked environment, program modules depicted relative to the computer 1702, or portions thereof, can be stored in the remote memory/storage device 1750. It will be appreciated that the network connections shown are exemplary and other means of establishing a communications link between the computers can be used.

The computer 1702 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11 (a, b, g, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 18:
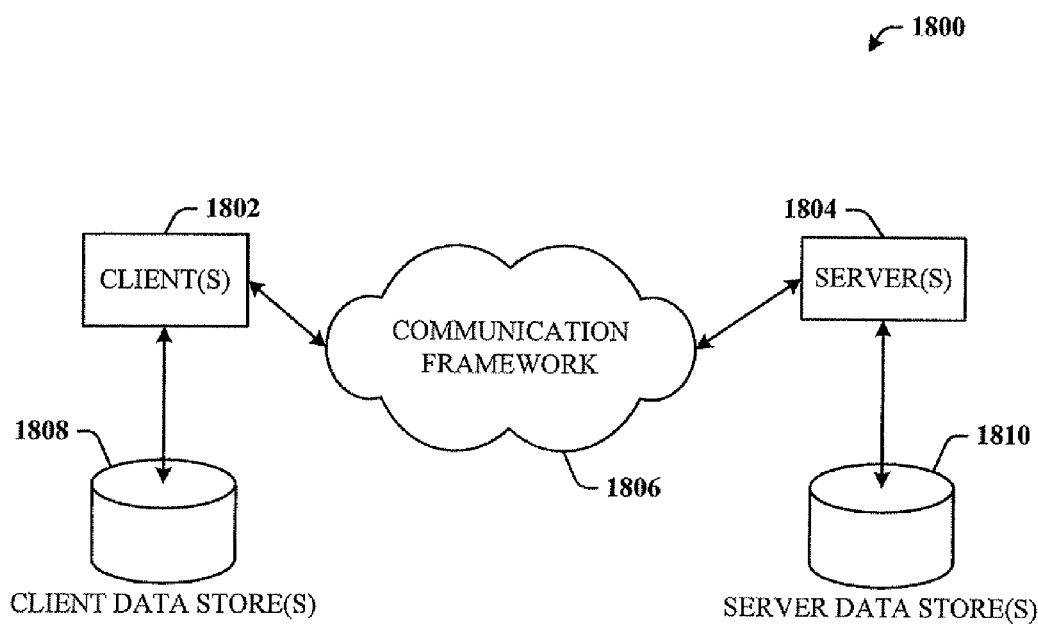
FIG. 18 illustrates a schematic block diagram of an exemplary computing environment.

Referring now to FIG. 18, there is illustrated a schematic block diagram of an exemplary computing environment 1800 in accordance with the subject invention. The system 1800 includes one or more client(s) 1802. The client(s) 1802 can be hardware and/or software (e.g., threads, processes, computing devices). The client(s) 1802 can house cookie(s) and/or associated contextual information by employing the invention, for example.

The system 1800 also includes one or more server(s) 1804. The server(s) 1804 can also be hardware and/or software (e.g., threads, processes, computing devices). The servers 1804 can house threads to perform transformations by employing the invention, for example. One possible communication between a client 1802 and a server 1804 can be in the form of a data packet adapted to be transmitted between two or more computer processes. The data packet may include a cookie and/or associated contextual information, for example. The system 1800 includes a communication framework 1806 (e.g., a global communication network such as the Internet) that can be employed to facilitate communications between the client(s) 1802 and the server(s) 1804.

Communications can be facilitated via a wired (including optical fiber) and/or wireless technology. The client(s) 1802 are operatively connected to one or more client data store(s) 1808 that can be employed to store information local to the client(s) 1802 (e.g., cookie(s) and/or associated contextual information). Similarly, the server(s) 1804 are operatively connected to one or more server data store(s) 1810 that can be employed to store information local to the servers 1804.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of operating a location aware wireless device, the method comprising:
    computing a location of the location aware wireless device;
    predicting a future activity of a user based on user context and the computed location;
    determining a direction in which the location aware wireless device is being pointed;
    determining a field of view associated with the direction;
    retrieving, from at least one network resource, information regarding at least one business within the determined field of view that relates to the predicted future activity, the retrieving being based at least on the computed location, the determined field of view, and the predicted future activity, and wherein the at least one network resource includes information identifying a type of business for each of the at least one business;
    accessing user preferences;
    inferring that at least a portion of the retrieved information may be of potential interest to the user, wherein the inferring is based upon:
        the user preferences,
        a satiation model that employs historical data associated with an amount of time since the user visited a particular type of business, and
        availability of the particular type of business in the direction in which the location aware wireless device is being pointed; and
    presenting at least the inferred portion of the retrieved information to the user.

2. The method of claim 1, wherein the method further comprises:
    querying a shadow log to determine if the location aware wireless device has or is about to enter a communications shadow.

3. The method of claim 1, wherein the method further comprises:
    determining an identity of the user; and
    storing the retrieved information regarding the at least one business in association with the identity as at least a portion of the historical data.

4. The method of claim 1, wherein the method further comprises:
    filtering the retrieved information based on the user preferences.

5. The method of claim 1, further comprising:
    computing another direction in which the location aware wireless device is moving.

6. The method of claim 1, wherein the user context comprises a time since an activity of the same type as the predicted future activity was carried out.

7. The method of claim 1, wherein the user context comprises at least one environmental parameter, the at least one environmental parameter comprising at least one of ambient lighting, time of day, day of year, or season.

8. The method of claim 1, wherein the retrieved information includes information regarding a business located inside or behind a structure situated in the direction.

9. The method of claim 1, wherein inferring that at least the portion of the retrieved information may be of potential interest to the user includes:
    employing a probabilistic analysis, a statistical analysis, or a probabilistic and statistical analysis to infer a situation or an action that the user desires to be automatically performed.

10. A computer-readable storage device, comprising at least one of a disk, disc, drive, or memory, that has instructions stored therein for providing location based services to a mobile device by performing operations, the operations comprising:
    computing a location of the mobile device;
    predicting a future activity of a user based on user context and the computed location;
    determining a direction in which the mobile device is being pointed;
    determining a field of view associated with the direction;

retrieving, from at least one network resource, information regarding at least one business within the determined field of view that relates to the predicted future activity, the retrieving being based at least on the computed location, the determined field of view, and the predicted future activity, and wherein the at least one network resource includes information identifying a type of business for each of the at least one business;

accessing user preferences;

inferring that at least a portion of the retrieved information may be of potential interest to the user, wherein the inferring is based upon:
 the user preferences,
 a satiation model that employs historical data associated with an amount of time since the user visited a particular type of business, and
 availability of the particular type of business in the direction; and presenting at least the inferred portion of the retrieved information to the user.

11. The computer-readable storage device of claim 10, wherein the operations further comprise:
 computing another direction in which the mobile device is moving.

12. The computer-readable storage device of claim 10, wherein the user context comprises:
 a time since an activity of the same type as the predicted future activity was carried out; and
 at least one environmental parameter, the at least one environmental parameter comprising at least one of ambient lighting, time of day, day of year, or season.

13. The computer-readable storage device of claim 10, wherein the retrieved information includes information regarding a business located inside or behind a structure situated in the direction.

14. The computer-readable storage device of claim 10, wherein inferring that at least the portion of the retrieved information may be of potential interest to the user includes:
 employing a probabilistic analysis, a statistical analysis, or a probabilistic and statistical analysis to infer a situation or an action.

15. A wireless device, comprising:
 a memory and a processor that are respectively adapted to store and execute instructions that implement operations, the operations comprising:
 computing a location of the wireless device;
 predicting a future activity of a user based on user context and the computed location;
 determining a direction in which the wireless device is being pointed;
 determining a field of view associated with the direction;
 retrieving, from at least one network resource, information regarding at least one business within the determined field of view that relates to the predicted future activity, the retrieving being based at least on the computed location, the determined field of view, and the predicted future activity, and wherein the at least one network resource includes information identifying a type of business for each of the at least one business;
 accessing user preferences;
 inferring that at least a portion of the retrieved information may be of potential interest to the user, wherein the inferring is based upon:
 the user preferences,
 a satiation model that employs an amount of time since the user stopped at a location associated a particular type of business, and
 availability of the particular type of business in the direction in which the location aware wireless device is being pointed; and
 presenting at least the inferred portion of the retrieved information to the user.

16. The wireless device of claim 15, wherein the operations further comprise:
 computing another direction in which the wireless device is moving.

17. The wireless device of claim 15, wherein the user context comprises a time since an activity of the same type as the predicted future activity was carried out.

18. The wireless device of claim 15, wherein the user context comprises at least one environmental parameter, the at least one environmental parameter comprising at least one of ambient lighting, time of day, day of year, or season.

19. The wireless device of claim 15, wherein the retrieved information includes information regarding a business located inside or behind a structure situated in the direction.

20. The wireless device of claim 15, wherein inferring that at least the portion of the retrieved information may be of potential interest to the user includes:
 employing a probabilistic analysis, a statistical analysis, or a probabilistic and statistical analysis to infer a situation or an action.

* * * * *